US011748796B2

(12) United States Patent
Gupta et al.

(10) Patent No.: US 11,748,796 B2
(45) Date of Patent: Sep. 5, 2023

(54) AUTOMATIC CLUSTERING AND MAPPING OF USER GENERATED CONTENT WITH CURATED CONTENT

(71) Applicant: Adobe Inc., San Jose, CA (US)

(72) Inventors: Sourabh Gupta, Noida (IN); Mrinal Kumar Sharma, Hazaribagh (IN); Gourav Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 385 days.

(21) Appl. No.: 16/824,180

(22) Filed: Mar. 19, 2020

(65) Prior Publication Data

US 2021/0295423 A1  Sep. 23, 2021

(51) Int. Cl.
*G06Q 30/0601* (2023.01)
*G06N 3/08* (2023.01)
(Continued)

(52) U.S. Cl.
CPC ....... *G06Q 30/0623* (2013.01); *G06F 16/583* (2019.01); *G06F 18/2148* (2023.01); *G06F 18/23* (2023.01); *G06N 3/04* (2013.01); *G06N 3/08* (2013.01); *G06Q 30/0643* (2013.01); *G06V 10/454* (2022.01); *G06V 10/763* (2022.01); *G06V 10/764* (2022.01); *G06V 10/774* (2022.01); *G06V 10/82* (2022.01);
(Continued)

(58) Field of Classification Search
CPC ............ G06Q 30/0643; G06Q 30/0623; G06F 16/583; G06F 3/0482; G06F 2203/04806; G06F 3/04842; G06F 3/04845; G06F 3/0488; G06F 16/54; G06K 9/6218; G06K 9/6257; G06K 9/6256; G06K 9/6223; G06K 9/6271; G06N 3/04; G06N 3/08; G06N 3/0454; G06N 3/088; G06V 10/235; G06V 20/20; G06V 10/82; G06V 10/454
See application file for complete search history.

(56) References Cited

U.S. PATENT DOCUMENTS

2013/0083999 A1* 4/2013 Bhardwaj ............... G06V 10/50
382/165
2017/0161957 A1* 6/2017 Yajima ................... G06V 20/20
(Continued)

OTHER PUBLICATIONS

Yu Liu, Xun Chen, Hu Peng , Zengfu Wang. "Multi-focus image fusion with a deep convolutional neural network", 2016, Elsevier (Year: 2016).*

*Primary Examiner* — YuJang Tswei
(74) *Attorney, Agent, or Firm* — Keller Preece PLLC

(57) ABSTRACT

Methods, systems, and non-transitory computer readable media are disclosed for determining a sub-set of user-submitted images that are similar to a curated image and presenting the sub-set of user-submitted images in connection with the curated image. The disclosed system presents a curated image depicting a product via a graphical user interface (e.g., on an e-commerce platform). In one or more embodiments, the disclosed system extracts feature vectors from the curated image and a plurality of user-submitted images. The disclosed system compares the feature vectors from the curated image and the plurality of user-submitted images to determine a sub-set of user-submitted images that are similar to the curated image. The disclosed system presents the sub-set of user-submitted images based on a user selection of the curated image.

20 Claims, 14 Drawing Sheets

(51) Int. Cl.
*G06N 3/04* (2023.01)
*G06F 16/583* (2019.01)
*G06V 20/20* (2022.01)
*G06F 18/23* (2023.01)
*G06F 18/214* (2023.01)
*G06V 10/762* (2022.01)
*G06V 10/764* (2022.01)
*G06V 10/774* (2022.01)
*G06V 10/82* (2022.01)
*G06V 10/44* (2022.01)
*G06F 3/0482* (2013.01)
*G06V 10/22* (2022.01)
*G06F 3/04842* (2022.01)
*G06N 3/088* (2023.01)
*G06F 16/54* (2019.01)
*G06F 3/0488* (2022.01)
*G06F 3/04845* (2022.01)

(52) U.S. Cl.
CPC ............ *G06V 20/20* (2022.01); *G06F 3/0482* (2013.01); *G06F 3/0488* (2013.01); *G06F 3/04842* (2013.01); *G06F 3/04845* (2013.01); *G06F 16/54* (2019.01); *G06F 2203/04806* (2013.01); *G06N 3/088* (2013.01); *G06V 10/235* (2022.01)

(56) References Cited

U.S. PATENT DOCUMENTS

| | | | | |
|---|---|---|---|---|
| 2017/0193545 | A1* | 7/2017 | Zhou | G06Q 30/0254 |
| 2019/0258895 | A1* | 8/2019 | Sacheti | G06V 10/751 |
| 2019/0340392 | A1* | 11/2019 | Khorrami | G06N 20/00 |
| 2020/0174149 | A1* | 6/2020 | Thiruvenkatanathan | G01V 1/307 |
| 2021/0201373 | A1* | 7/2021 | Trinh | G06F 16/5866 |
| 2021/0241035 | A1* | 8/2021 | Sutherland | G06K 9/623 |

* cited by examiner

AUTOMATIC CLUSTERING AND MAPPING OF USER GENERATED CONTENT WITH CURATED CONTENT

BACKGROUND

Recent years have seen significant improvement in hardware and software platforms for buying and selling products by electronic means. For example, developers have created technologies to modify or improve e-commerce platforms to provide information about and sell products. To illustrate, beside presenting product details including price, specifications, offers, and other details, conventional e-commerce systems often present product images to assist buyers. For example, conventional e-commerce systems may upload product images taken and submitted by sellers.

SUMMARY

One or more embodiments provide benefits and/or solve one or more of the foregoing or other problems in the art with systems, methods, and non-transitory computer readable storage media that intelligently cluster user-submitted images of a product, map the clustered user-submitted images to similar curated images, and surface the mapped user-submitted images in connection with the similar curated images utilizing computer vision techniques. To illustrate, the disclosed system can extract feature parameters from both the user-submitted images and the curated images. The disclosed system can identify user-submitted images similar to the curated images by comparing the respective feature vectors. The disclosed system can also generate aesthetic scores for the similar user-submitted images and surface similar user-submitted images with high aesthetic scores. Additionally, the disclosed system can identify and surface user-submitted images of the product that have views not provided in the curated images. The disclosed system can present the user-submitted images of the product via an intuitive graphical user interface.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
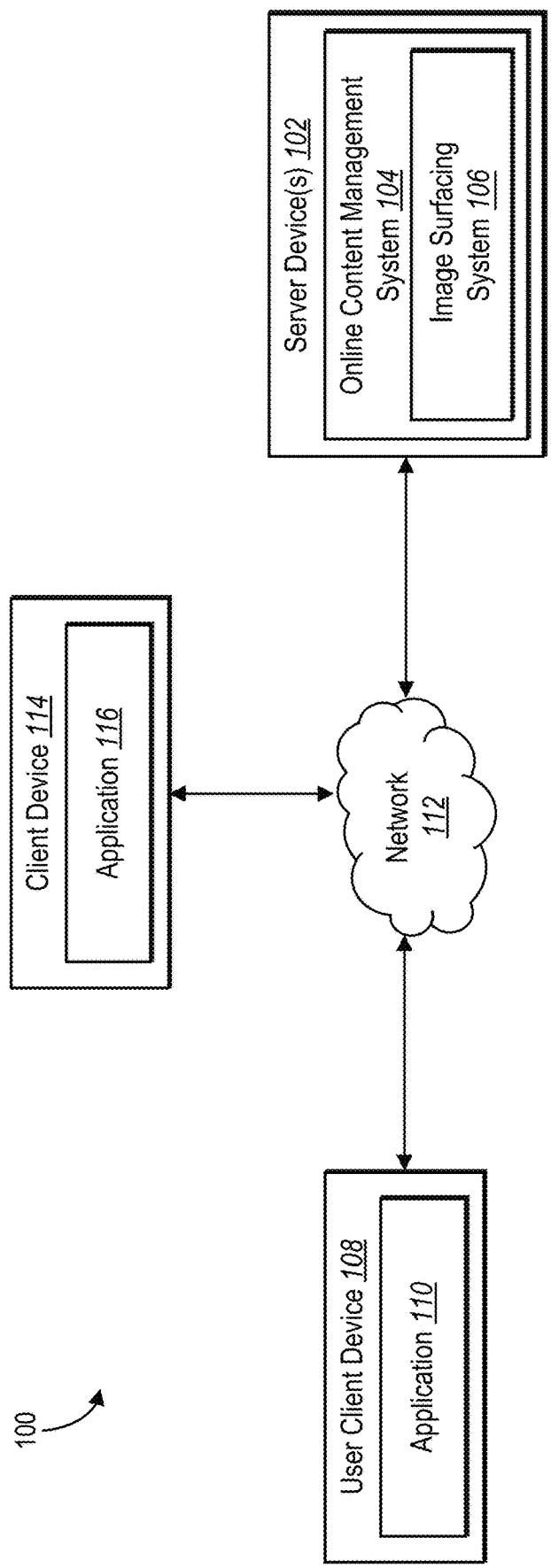
FIG. 1 illustrates an environment in which an image surfacing system can operate in accordance with one or more embodiments of the present disclosure.

One or more embodiments of the present disclosure include an image surfacing system that intelligently identifies, maps, and surfaces user-submitted images in connection with curated images of a product utilizing computer vision techniques. For example, the image surfacing system can analyze a plurality of user-submitted images of a product and cluster the user-submitted images in to groupings of similar views. The image surfacing system can also map the groupings of user-submitted images to curated images of the product. The image surfacing system can surface the user-submitted images with a similar view to a corresponding curated image of the product by providing them in a graphical user interface with the curated images. Additionally, the image surfacing system can identify product views not included in the curated images and supplement the curated images with user-submitted images depicting the product in the additional views.

As mentioned above, the image surfacing system can utilize computer vision techniques to intelligently surface user-submitted images. For example, the image surfacing system can utilize deep learning and neural networks to identify/detect, map, and characterize user-submitted images. For example, the image surfacing system can extract descriptors or features from the digital images (both curated and user-submitted) to generate feature vectors that characterize the digital images. In one or more embodiments, the image surfacing system can generate the feature vectors utilizing a neural network encoder that extracts deep or latent features from the digital images.

Additionally, the image surfacing system can map user-uploaded images with a particular product view and display them in parallel with a seller image sharing the same product view. In particular, the image surfacing system can scan uploaded seller images and extract shape descriptors or feature params from the seller photos. The image surfacing system can identify the product in user-uploaded images, isolate the product, and extract shape descriptors or feature parameters from the product in the user-uploaded images. The image surfacing system can analyze and compare the shape descriptors or feature parameters to group user-uploaded images with similar seller images. Furthermore, the image surfacing system can identify missing product perspectives from the seller images based on received user-submitted images and display user-submitted images depicting the product using the missing views. The image surfacing system can display the user-uploaded images organized by group via a graphical user interface. As explained in greater detail below, the image surfacing system can utilize the feature vectors to cluster the user-submitted images and map the user-submitted images to curated images.

In order to extract feature vectors from the user-submitted images, in one or more embodiments, the image surfacing system can first detect or locate the product within the user-submitted images. In particular, user-submitted images can be noisy and contain objects other than the product. In order to help ensure that the image surfacing system generates feature vectors for the product and rather than for other objects in the images, the image surfacing system can use deep learning and computer vision object detection to detect and locate the product in the user-submitted images. This can help ensure that the image surfacing system does not surface user-submitted images lacking the product. For example, the image surfacing system can use neural network to detect potential objects in the user-submitted images. The image surfacing system can then use a classifier of the neural network to classify the potential objects. The image surfacing system can then identify the location of potential objects that have a class corresponding to the product. The image surfacing system can then generate a feature vector for the localized portion of the images including the product.

Having generated feature vectors both for the curated images and the user-submitted images, the image surfacing system may determine a sub-set of the user-submitted images that are similar to the curated image by comparing the feature vectors of the plurality of user-submitted images with the feature vector of the curated image. In particular, the image surfacing system can cluster the user-submitted images having similar views and orientations of the product. In particular, the image surfacing system can map the feature vectors from the user-submitted images and the feature vectors from the curated image in a vector space. The image surfacing system can utilize various methods to generate clusters of similar images.

In at least one embodiment, the image surfacing system creates a new cluster for images that depict views of the product missing from the curated images. The image surfacing system can identify a missing view by identifying feature vectors of user-submitted images that significantly differ from feature vectors of curated images. To generate the new cluster, the image surfacing system can determine that the distance between a user-submitted image and the nearest curated image exceeds a threshold distance. The image surfacing system can create a new cluster including the user-submitted image. For example, curated images might include top, side, and front views of the product. The image surfacing system can determine that a user-submitted image depicting the product from a bottom view is significantly different than the existing curated images and generate a new cluster of user-submitted images depicting the product from a bottom view. Thus, the image surfacing system can create new clusters for user-submitted images depicting views and angles missed by the curated images.

In addition to the foregoing, may user-submitted images may be low quality. The image surfacing system can use deep learning to rank the user-submitted images based on aesthetic quality. The image surfacing system can then surface the highest quality user-submitted images. Thus, the image surfacing system can avoid a user having to view low quality user-submitted images.

The image surfacing system can receive, via the graphical user interface, a user selection of the curated image, and based on the user selection, the image surfacing system may present the sub-set of user-submitted images that are similar to the curated image. In particular, the image surfacing system may present the clustered user-submitted in an organized flow via a graphical user interface. Additionally, the image surfacing system can present user-submitted images in new clusters via the graphical user interface.

The image surfacing system also provides several technical benefits relative to conventional systems. Specifically, conventional e-commerce systems are often inflexible and inefficient. For instance, conventional e-commerce systems often inflexibly display a rigid range of seller images. In particular, conventional e-commerce systems often simply provide curated product images provided by the seller. Thus, the images displayed by conventional e-commerce systems often include images of the product from a set number of angles and views. Consequently, conventional e-commerce systems often provide only a limited visual overview of the product. Potential buyers interested in seeing the product from additional angles and views are often left without recourse when using conventional e-commerce systems.

Additionally, conventional e-commerce systems often display unfair or overly flattering product images. For example, product images procured and uploaded by the seller often do not provide a fair representation of the product. In particular, seller-provided product images are often captured in an artificial photography environment with lighting and adjustments to create more appealing images. Additionally, seller-provided product images are often edited in post or otherwise manipulated to make the product seem more desirable. Many conventional e-commerce systems present these artificially enhanced seller images. Thus, seller-provided product images often inaccurately portray the actual product.

Some conventional systems attempt to resolve the foregoing shortcomings by allowing for the uploading and displaying of user-provided product images. For example, conventional e-commerce systems may include user review sections comprising product reviews and images. Unfortunately, a user attempting to find a user-submitted image of a particular view of a product is typically required to perform many steps and navigate to and search through potentially large numbers of images and reviews. Indeed users often waste effort searching for additional images only to not discover them or give up after wasting time. Furthermore, even if the user finds the desired view, many user-submitted photos are low quality or otherwise unhelpful. The shortcomings associated with searching through user-submitted images for a desired view or views are exacerbated when trying to do so on handheld devices due to the lack of screen space.

The image surfacing system can improve efficiency relative to conventional systems. The image surfacing system intelligently clusters user-submitted images and maps them to similar curated images. As mentioned, the image surfacing system can utilize a machine learning model to extract feature vectors from the curated images and the user-submitted images and cluster the images based on distances between the feature vectors falling within a threshold distance. The image surfacing system can present the clustered images via a graphical user interface. Thus, instead of presenting all user-submitted images and requiring a user to browse through the repository of user-submitted images to find a particular view, the image surfacing system presents an organized selection of user-submitted images organized by view. Thus, the image surfacing system can improve computing systems by improving the speed of a user's navigation through various views and windows by surfacing relevant user-submitted images in a graphical user interface. In other words, the image surfacing system can automatically surface relevant user-submitted images in a single graphical user interface, thereby eliminating the need for a user to navigate through potentially hundreds of reviews to locate such images.

Furthermore, the image surfacing system can increase system efficiency by sharing lower neural network layers (e.g., deep neural encoder) for various different tasks. In particular, the image surfacing system can utilize the same deep neural encoder as part of two or more of the processes of generating the feature vectors for clustering and mapping the images, localizing the product in the user-submitted images, and generating aesthetic scores for the user-submitted digital images. By sharing the same deep neural encoder for multiple computer vision tasks, the image surfacing system can reduce needed computing resources and processing times compared to conventional systems that employ separate networks for each task. Thus, the image surfacing system improves computing systems by reducing computing resources and processing times.

The following disclosure provides additional detail regarding the image surfacing system in relation to illustrative figures portraying example embodiments and implementations of the image surfacing system. For example, FIG. 1 illustrates a schematic diagram of a system environment (or "environment") 100 in which an image surfacing system 106 can operate in accordance with one or more embodiments. As illustrated, the environment 100 includes one or more server device(s) 102 connected to a user client device 108, and a client device 114 via a network 112. While FIG. 1 shows an embodiment of the image surfacing system 106, alternative embodiments and configurations are possible.

As shown in FIG. 1, the server device(s) 102, the client device 114, and the user client device 108 are connected via the network 112. Each of the components of the environment 100 can communicate via the network 112. The network 112 comprises any suitable network over which computing devices can communicate. Example networks are discussed in additional detail below in relation to FIG. 11.

As shown, the environment 100 includes the server device(s) 102. The server device(s) 102 may generate, store, receive, and transmit digital content including digital video, digital images, digital audio, metadata, etc. In particular, the server device(s) 102 can provide digital content via web pages to devices such as the user client device 108 and the client device 114. The server device(s) 102 can communicate with the user client device 108 and the client device 114 via the network 112. For example, the server device(s) 102 may gather and/or receive digital images including product images from the client device 114 and the user client device 108. The server device(s) 102 may also present digital images at the user client device 108 and the client device 114. In some embodiments, the server device(s) 102 comprise a distributed server where the server device(s) 102 include a number of server devices distributed across the network 112 and located in different physical locations. The server device(s) 102 can comprise a content server, an application server, a communication server, a web-hosting server, or a digital content management server.

As further shown in FIG. 1, the server device(s) 102 includes an online content management system 104. In one or more embodiments, the online content management system 104 can comprise an e-commerce management system that facilitates the online purchase of products over the network 112. The online content management system 104 also performs various backend functions associated with the online presence of a seller in order to facilitate the online purchase of products. For example, the online content management system 104 generates web pages or other types of network content that are provided to the user client device 108 for the purpose of selecting items for purchase, rental, download, lease, or other form of consumption as will be described.

As illustrated in FIG. 1, the image surfacing system 106 is implemented as part of the online content management system 104. Generally, the image surfacing system 106 intelligently surfaces user-submitted images in connection with curated images. More specifically, the image surfacing system 106 receives, stores, and extracts feature vectors from curated images received from the client device 114. The image surfacing system 106 also receives, stores, and extracts feature vectors from user-submitted images from one or more users of the online content management system 104 (e.g., via the user client device 108). The image surfacing system 106 clusters the user-submitted images based on the extracted feature vectors—either mapping the user-submitted images to the nearest curated image or creating new clusters based on a distance threshold. The image surfacing system 106 can communicate with the user client device 108 and the client device 114.

As illustrated in FIG. 1, the environment 100 includes the user client device 108 and the client device 114. The user client device 108 and the client device 114 can generate, store, receive, and send digital data. For example, the user client device 108 and the client device 114 communicate with the server device(s) 102 via the network 112. The user client device 108 and the client device 114 illustrated in FIG. 1 may comprise various types of client devices. For example, in some embodiments, the user client device 108 and the client device 114 include mobile devices such as laptops, tablets, mobile telephones, smartphones, etc. In other embodiments, the user client device 108 and the client device 114 include non-mobile devices, such as desktops or servers, or other types of client devices. Additional details with regard to the user client device 108 and the client device 114 are discussed below with respect to FIG. 12.

The user client device 108 can be associated with a user of an e-commerce platform managed by the online content management system 104. For instance, the user client device 108 can be associated with a buyer of a product. Additionally, the user client device 108 can be associated with a user who is browsing and viewing products listed by the online content management system 104. As mentioned, the user client device 108 communicates with the server device(s) 102. In particular, the user client device 108 uploads and sends digital data including digital images (e.g., user-submitted images) to the server device(s) 102 via the network 112. Additionally, the user client device 108 can display graphical user interfaces including product images to a user associated with the user client device 108.

As further illustrated in FIG. 1, the user client device 108 includes an application 110. The application 110 may be a web application or a native application on the user client device 108 (e.g., a mobile application, a desktop application, etc.). The application 110 can interface with the image surfacing system 106 to provide digital content including user-submitted images to the server device(s) 102. For example, the application 110 may comprise a browser that renders a graphical user interface that includes product information and images on a display of the user client device 108. Additionally, the application 110 may also render a graphical user interface for uploading user-submitted images. The application 110 can send and receive data from the image surfacing system 106 and can present, for display at the user client device 108, organized user-submitted images generated by image surfacing system 106.

Environment 100 includes the client device 114. The client device 114 can be associated with a seller of a product or a marketer of a product. The client device 114 can communicate with the server device(s) 102. For example, the client device 114 can send, to the server device(s) 102 information regarding products for sale by the seller including curated images displaying a product, product price, product specifications, and other information.

The client device 114 includes an application 116. The application 116 may be a web application or a native application on the client device 114 (e.g., a mobile application, a desktop application, etc.). The application 116 can interface with the image surfacing system 106 to provide digital content including product information such as curated images to the server device(s) 102. The application 116 may be a browser that renders a graphical user interface on the display of the client device 114. For example, the application 116 may render a series of graphical user interfaces for uploading product information and managing associations between product information and promotional content. Additionally, the application 116 may present simulations of web pages from a perspective of a user accessing the web page from the user client device 108. Simulating the web pages to preview content regarding the product allows the seller to review the product information.

Although FIG. 1 depicts the image surfacing system 106 located on the server device(s) 102, in some embodiments, the image surfacing system 106 may be implemented by (e.g., located entirely or in part) on one or more other components of the environment 100. For example, the image surfacing system 106 may be implemented entirely (or in part) on the user client device 108 and/or the client device 114. For example, the server device(s) 102, the user client device 108 and/or the client device 114 can have the digital images stored thereon.

Although the environment 100 includes a single user client device 108 and a single client device 114, in one or more embodiments, the environment 100 can include multiple user client devices and client devices. For example, the environment 100 can include a first user client device 108 associated with a buyer who uploads a user-submitted images of a purchased product. The environment 100 can also include a second user client device 108 associated with a user who is viewing a web page displaying product information for the product.

Additionally, the user client device 108 and the client device 114 can communicate directly with the image surfacing system 106, bypassing the network 112. Moreover, the image surfacing system 106 can access one or more databases (e.g., a digital image database) housed on the server device(s) 102 or elsewhere in the environment 100.

Further, the image surfacing system 106 can include one or more machine learning models (e.g., neural networks), and the image surfacing system 106 can be implemented in a variety of different ways across the server device(s) 102, the network 112, the client device 114, and the user client device 108.

Figure 2:
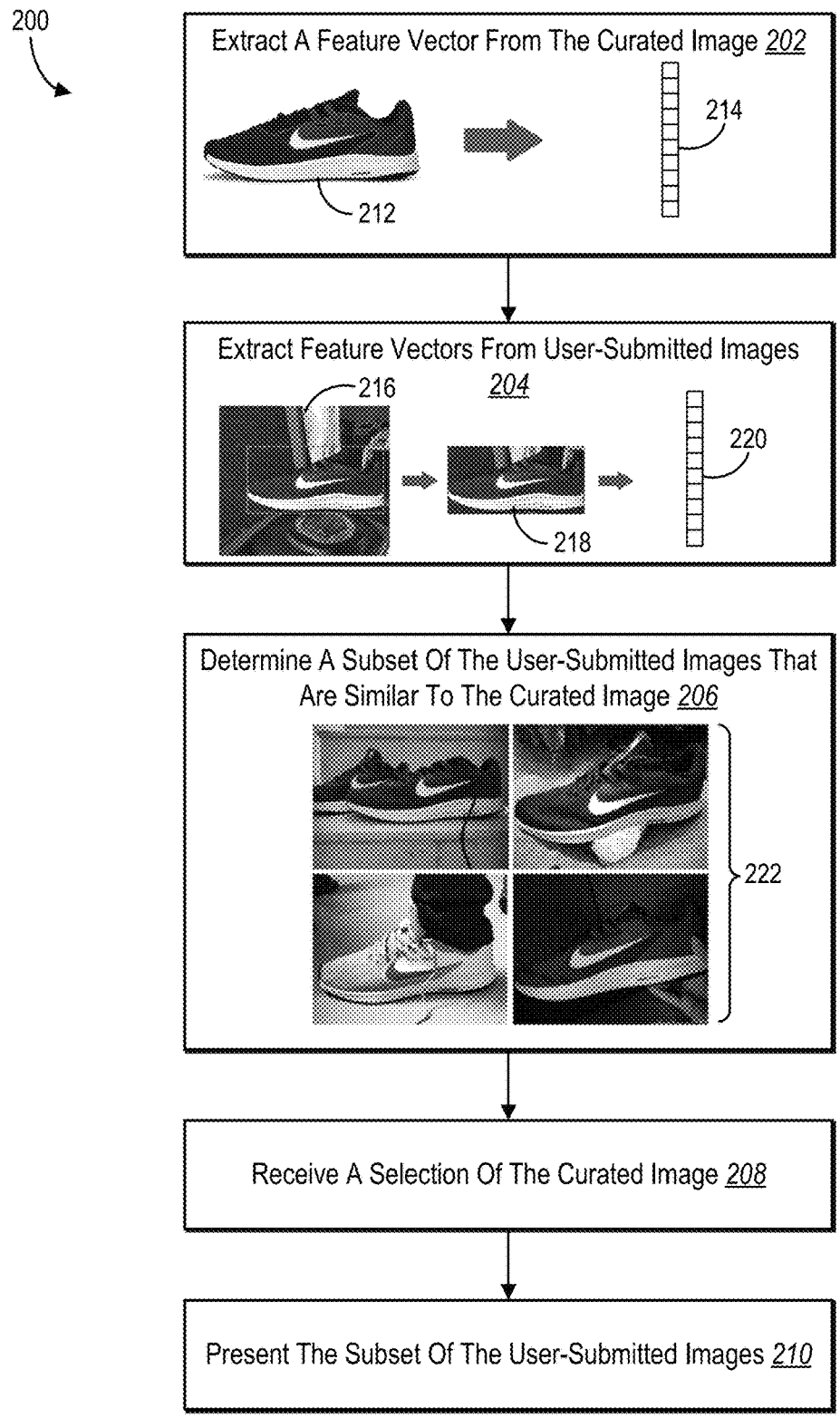
FIG. 2 illustrates an overview of steps that the image surfacing system can perform when determining and presenting a sub-set of user-submitted images that are similar to the curated image in accordance with one or more embodiments of the present disclosure.

FIG. 2 illustrates a general overview of how the image surfacing system 106 maps user-submitted images to similar curated images in one embodiment. For instance, FIG. 2 illustrates a series of acts 200 illustrating how the image surfacing system 106 generates and maps a subset of user-submitted images to a similar curated image. The series of acts 200 includes an act 202 of extracting a feature vector from the curated image, an act 204 of extracting feature vectors from user-submitted images, act 206 of determining a subset of the user-submitted images that are similar to the curated image, an act 208 of receiving a selection of the curated image, and an act 210 of presenting the subset of the user-submitted images.

A curated image can comprise an image that is provided by a seller or marketer of the product that depicts a product from a particular view. For example, sellers can create or otherwise procure curated images and display the curated images on an e-commerce platform. The e-commerce platform may display multiple curated images showing the product from different perspectives. Often, curated images are professionally captured and edited images.

In the act 202, the image surfacing system 106 extracts a feature vector from a curated image. A feature vector can comprise a vector of numeric values representing characteristics and attributes of an image. In particular, a feature vector can comprise a vector containing information describing characteristics of an image. In particular, a feature vector can include a set of values corresponding to latent and/or patent attributes and characteristics of an image. In one or more embodiments, a feature vector is a multi-dimensional dataset that represents or characterizes an image. In one or more embodiments, a feature vector includes a set of numeric metrics learned by a machine-learning algorithm such as a neural network.

For example, the image surfacing system 106 can extract or otherwise generate a feature vector for each curated image using any number of techniques. In particular, in one or more the image surfacing system 106 can extract shape descriptors and other feature parameters. The image surfacing system 106 can then compile these parameters into a feature vector to represent an image. For instance, the image surfacing system 106 can extract color descriptors, shape descriptors, texture descriptors etc.

In one or more implementations, the image surfacing system 106 can extract frequency domain descriptors such as (1) Binary Robust Independent Elementary Feature (BRIEF), (2) Oriented Fast and Rotated BRIEF (ORB), (3) Binary Robust Invariant Scalable Key points (BRISK) or (4) Fast Retina Key point (FREAK) descriptors. The image surfacing system 106 can utilize frequency domain descriptors for their low computational costs and usefulness in comparing images. For example, the image surfacing system 106 can extract ORB descriptors from an image and compile them into a feature vector to represent the image. More specifically, the image surfacing system 106 can utilize ORB descriptors or other descriptors that are scale and rotation invariant.

Alternatively or additionally, the image surfacing system 106 can utilize deep features. For example, in one or more embodiments, the image surfacing system 106 utilizes a neural network to generate feature vectors (as image descriptors) for the digital images. Indeed, the image surfacing system 106 can utilize a neural network, such as a CNN, to generate feature vectors by extracting features (e.g., visual characteristics and/or latent attributes) in different levels of abstractions. Indeed, the image surfacing system 106 can utilize a neural network including layers, but not limited to, one or more convolution layers, one or more activation layers (e.g., ReLU layers), one or more pooling layers, and/or one or more fully connected layers.

Figure 4:
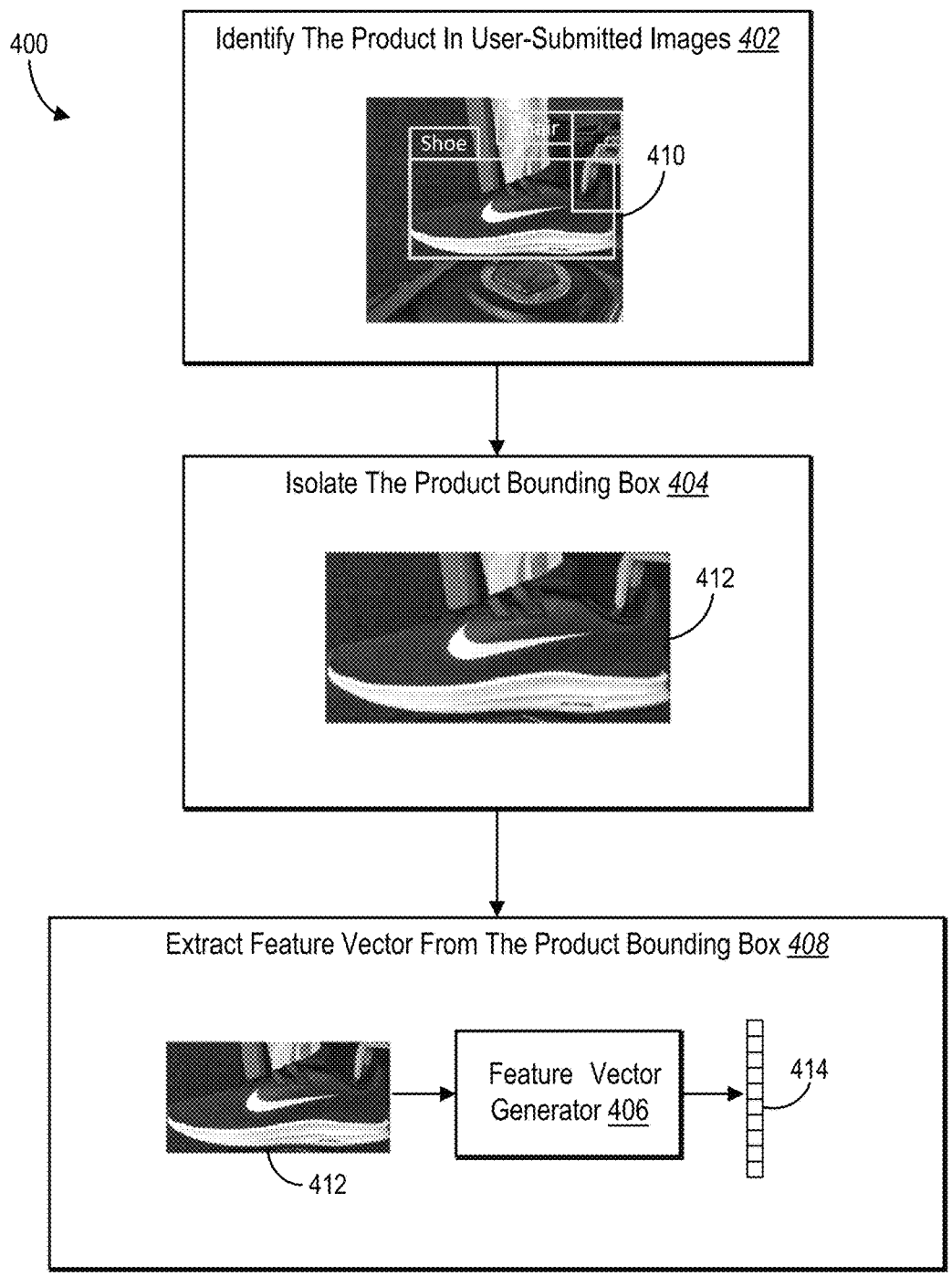
FIG. 4 illustrates an overview of steps that the image surfacing system can perform when generating feature vectors for user-submitted images in accordance with one or more embodiments of the present disclosure.
Figure 5:
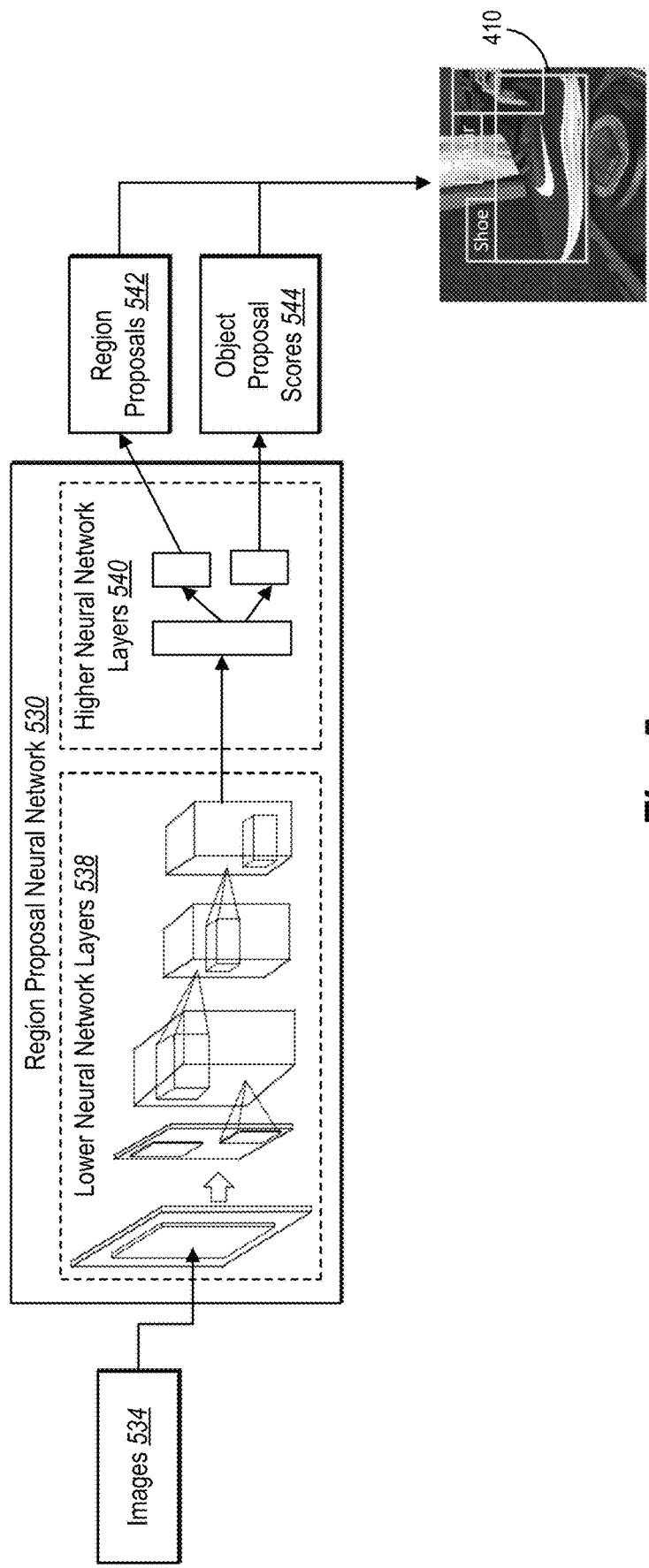
FIG. 5 illustrates a region proposal neural network for identifying and locating a product in a user-submitted image in accordance with one or more embodiments of the present disclosure.

In a manner similar to extracting feature vectors for the curated images, the image surfacing system 106 can also extract feature vectors from the user-submitted images. As shown by the act 204 illustrated in FIG. 2, the image surfacing system 106 extracts feature vectors from user-submitted images. User-submitted images, unlike most curated images, are often taken in a noisy environment and often include other objects in addition to the product. The image surfacing system 106 can isolate the product in user-submitted images and extract feature vectors from the isolated product to avoid distortion of feature vectors from the user-submitted images. In particular, as explained in greater detail below, the image surfacing system 106 can perform object detection on a user-submitted image 216 to identify and locate the product in the user-submitted image (e.g., can generate a bounding box 218 about the product). The image surfacing system 106 then crops the user-submitted image around the bounding box 218 extracts a feature vector 220 from the product bounding box 218. FIGS. 4-5 and the corresponding discussion provide additional detail regarding how the image surfacing system 106 can identify and isolate the product within user-submitted images.

Figure 6:
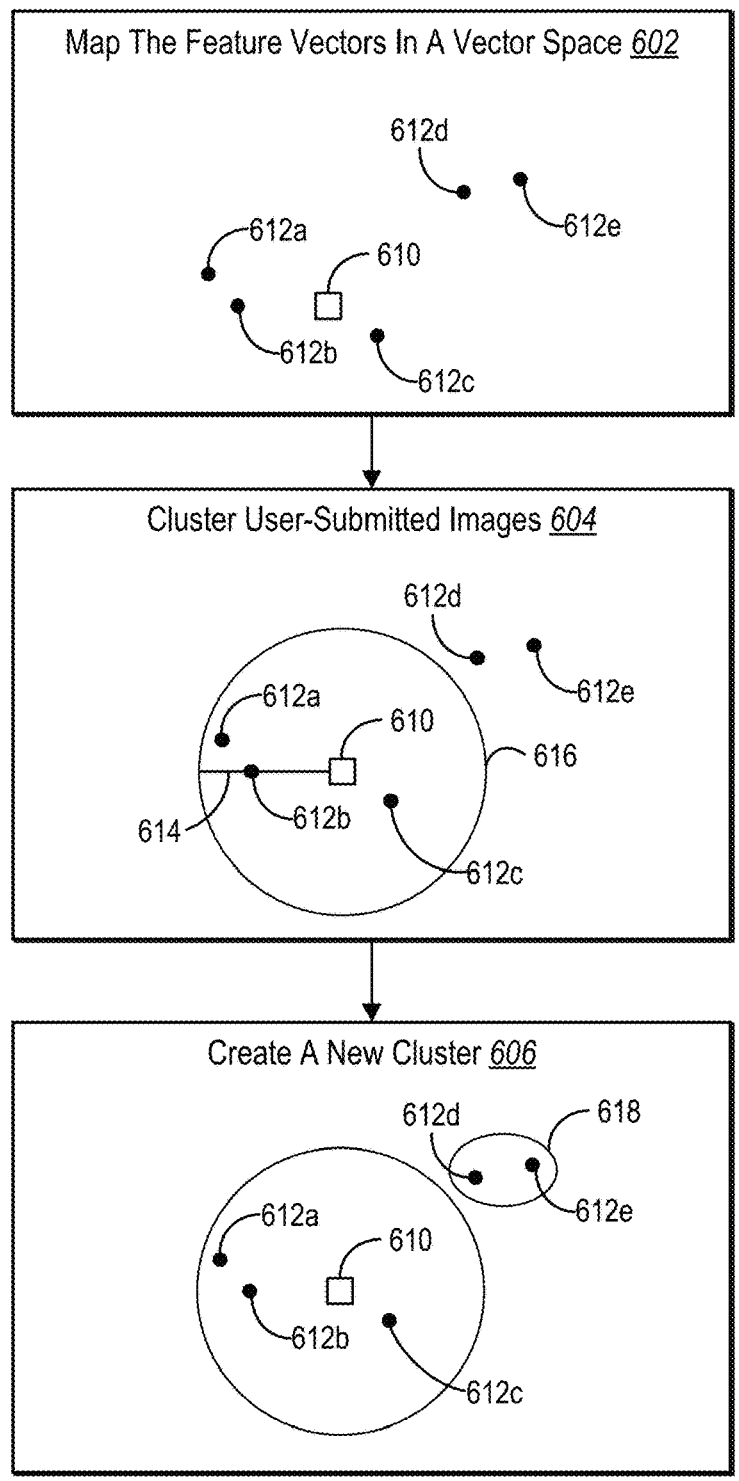
FIG. 6 illustrates a schematic diagram of clustering user-submitted images in accordance with one or more embodiments of the present disclosure.
Figure 7:
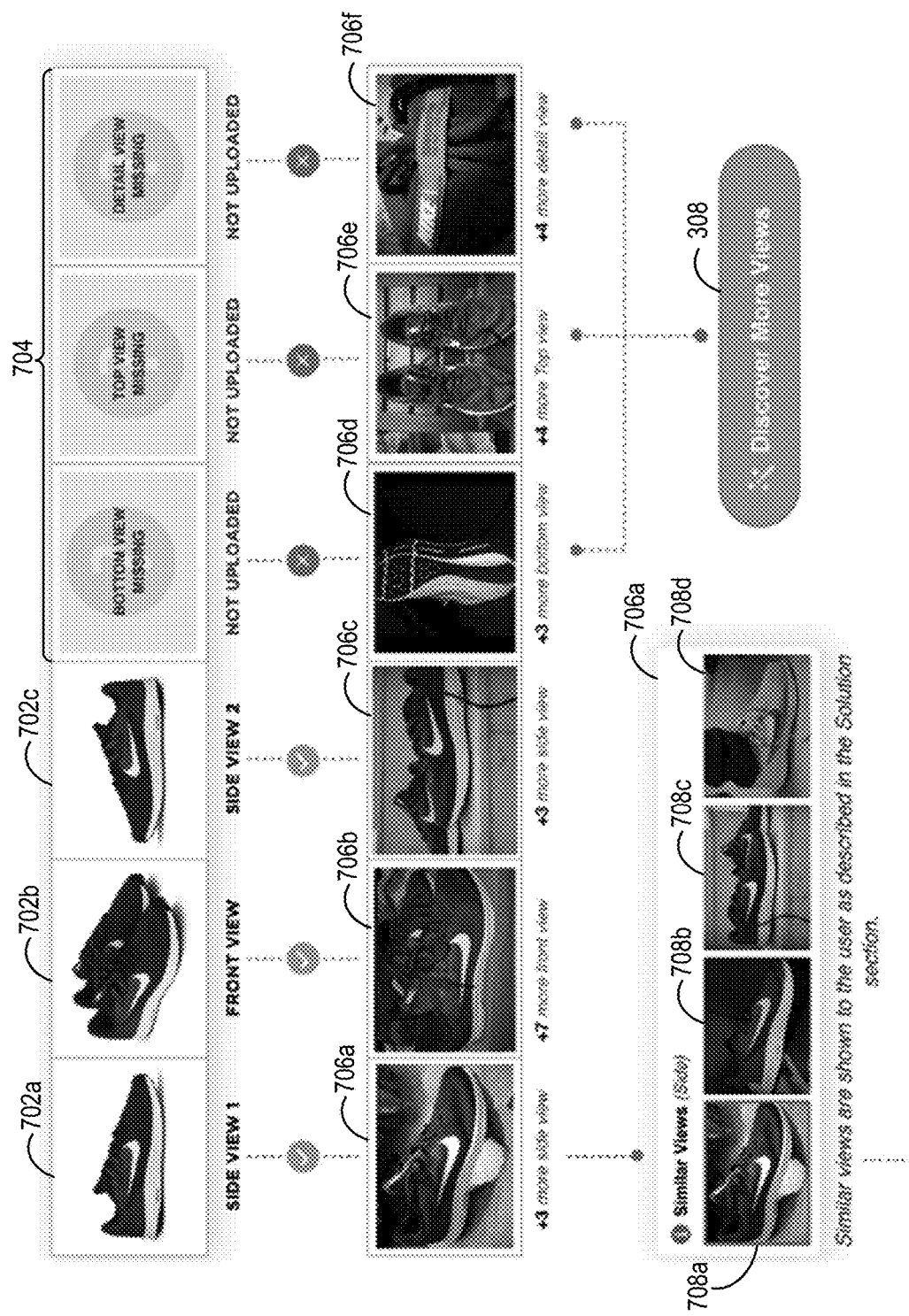
FIG. 7 illustrates a schematic diagram of mapping user-submitted images to curated images based on clustering of the user-submitted images in accordance with one or more embodiments of the present disclosure.

In the act 206, the image surfacing system 106 determines a subset of the user-submitted images that are similar to the curated image. As part of the act 206, the image surfacing system 106 analyzes feature vectors extracted from the curated image and compares them with the feature vector extracted from the user-submitted images extracted in the act 204. In at least one embodiment, the image surfacing system 106 clusters the user-submitted images with the curated image so that each user-submitted image is mapped to the closest curated image. As illustrated in FIG. 2, the image surfacing system 106 generates a cluster including a sub-set of user-submitted images 222 depicting the product from the same side view. The image surfacing system 106 maps the sub-set of user-submitted images 222 to the similar curated image 212. FIGS. 6 and 7 and the accompanying discussion provide additional detail regarding how the image surfacing system 106 generates the user-submitted image clusters.

As further illustrated in FIG. 2, the series of acts 200 includes the act 208 of receiving a selection of the curated image. In particular, the image surfacing system 106 presents a graphical user interface comprising curated images. The image surfacing system 106 can detect a selection of the curated image 212, such as a touch gesture or click of a mouse on the curated image 212.

In the act 210 the image surfacing system 106 presents the sub-set of the user-submitted images mapped to the curated image 212. Based on detecting selection of a curated image 212, the image surfacing system 106 presents the similar user-submitted images. For example, as illustrated in FIG. 2, based on detecting selection of the curated image 212, the image surfacing system 106 presents the sub-set of user-submitted images 222 that show the same view of the product as the curated image 212.

Figure 3A:
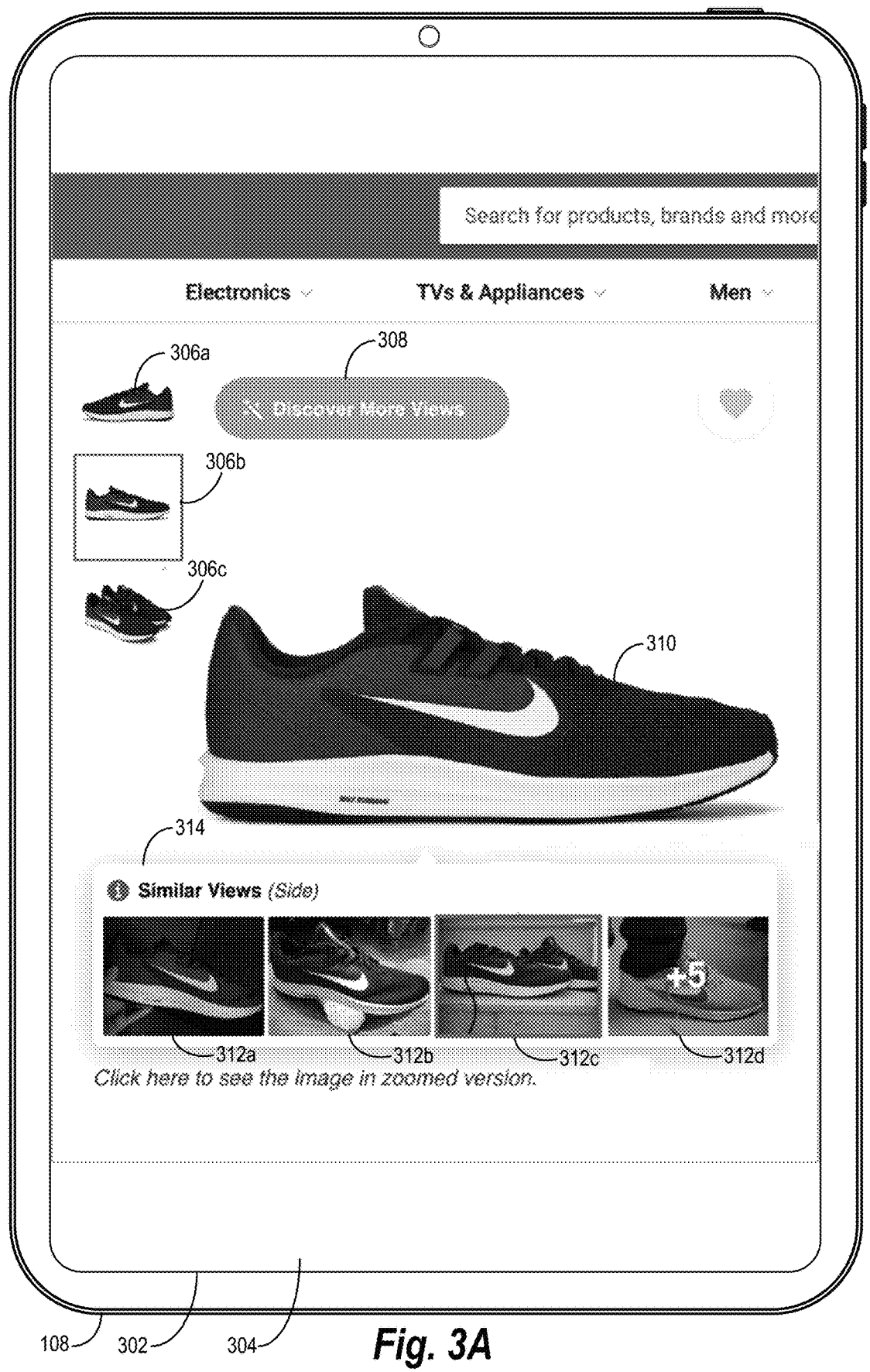
FIGS. 3A-3C illustrate example product display graphical user interfaces including intelligently surfaced user-submitted images in accordance with one or more embodiments of the present disclosure.
Figure 3B:
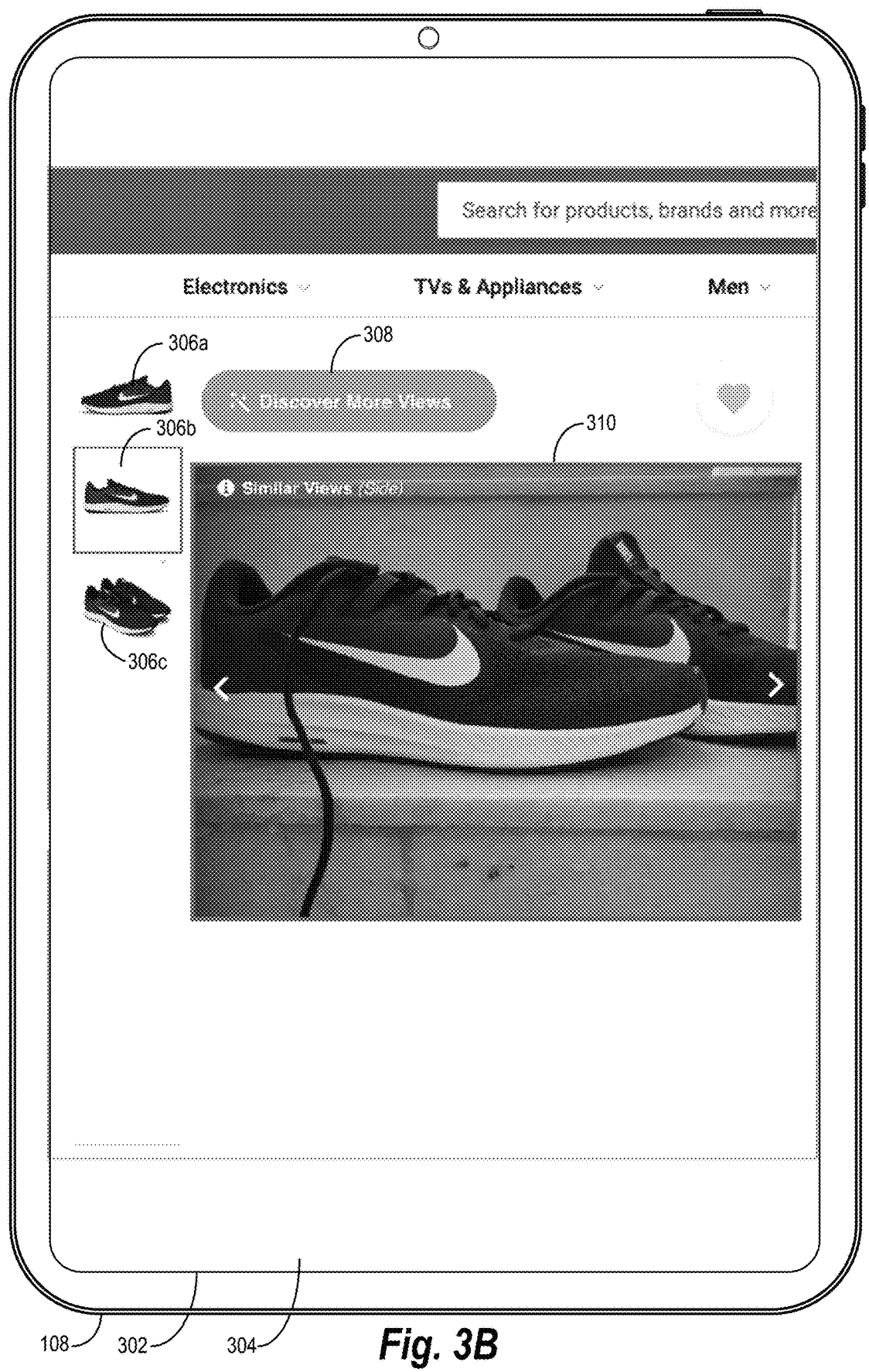
Figure 3C:
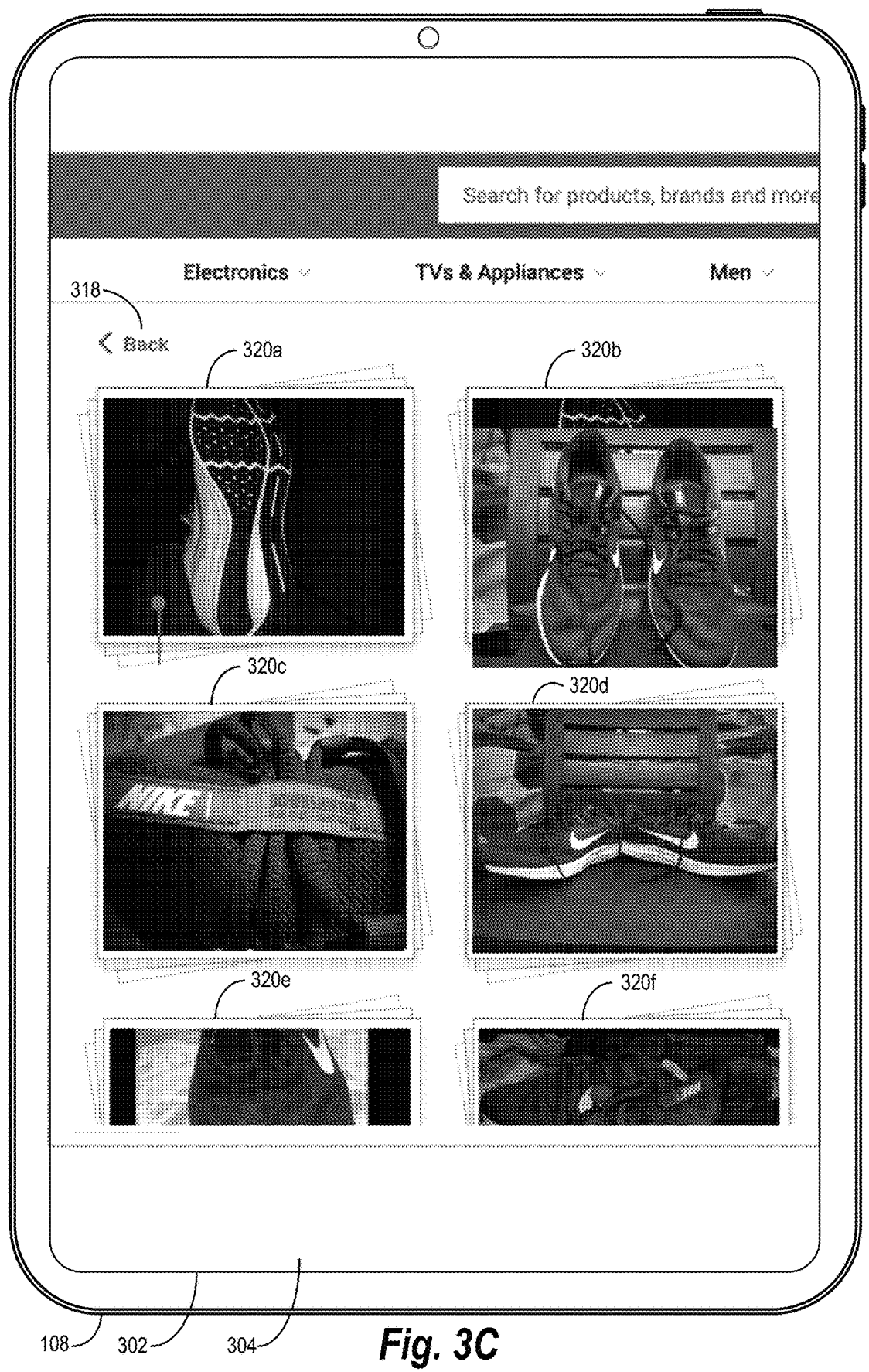

As mentioned, the image surfacing system 106 intelligently surfaces user-submitted images displaying a product. FIGS. 3A-3C including a series of example product display graphical user interfaces that illustrate how the image surfacing system 106 can surface the user-submitted images in one or more embodiments. FIG. 3A illustrates a product display graphical user interface 304 including a curated image and similar (e.g., displaying the same view) user-submitted images. Based on detecting user selection of a user-submitted image, the image surfacing system 106 can prominently display the selected user-submitted image. FIG. 3B illustrates the product display graphical user interface 304 including an enlarged user-submitted image. FIG. 3C illustrates the product display graphical user interface 304 including additional product views provided by user-submitted images supplementing views not included in the curated images.

FIG. 3A illustrates the product display graphical user interface 304 on a screen 302 of the user client device 108. As illustrated, the product display graphical user interface 304 includes curated images 306a-306c, an enlarged image area 310, an additional views element 308, and a sub-set of user-submitted images area 314 element including user-submitted images 312a-312d.

The curated images 306a-c comprise product images created or otherwise procured by a seller. As illustrated, the curated images 306a-c comprise professionally captured and/or generated images displaying various views of a product (i.e., a shoe). For example, the curated image 306a displays the product from a side view, the curated image 306b displays the product from another side, and the curated image 306c displays the product from an angled view. The curated images 306a-c include a limited set of angles and views for the product. For example, the curated images 306a-c are missing a front view, a bottom view, a top view, and other views. The image surfacing system 106 can prominently display a selected curated image of the curated images 306a-c. For example, based on detecting selection of the curated image 306b, the image surfacing system 106 presents the curated image 306b depicting the side view in the enlarged image area 310.

The image surfacing system 106 presents additional visual detail of the product via the enlarged image area 310. The enlarged image area 310 displays an enlarged product image. As illustrated in FIG. 3A, the enlarged image area 310 displays the curated image 306b. In at least one embodiment, the image surfacing system 106 detects user interaction with the enlarged image area 310 to provide additional visual detail. For example, the image surfacing system 106 can generate a zoom window displaying a zoomed in portion of the enlarged product image based on detecting a cursor hovering over the portion of the enlarged image area 310 (or other input indication such as a press and hold touch gesture).

As illustrated, the image surfacing system 106 also presents the additional views element 308 via the product display graphical user interface 304. Based on detecting user selection of the additional views element 308, the image surfacing system 106 presents additional views that are not included in the curated images 306a-c. FIG. 3C illustrates the product display graphical user interface 304 displaying additional product views supplied by user-submitted images.

The product display graphical user interface 304 includes a sub-set of user-submitted images area 314. The image surfacing system 106 presents user-submitted images that depict the product from the same view as the curated image displayed in the enlarged image area 310 in the user-submitted images area 314. As illustrated, the image surfacing system 106 presents, within the sub-set of user-submitted images area 314, the user-submitted images 312a-d. The user-submitted images 312a-d all depict the product from the same view (e.g., right side view) as the curated image 306b.

The image surfacing system 106 can update the product display graphical user interface 304 to present additional user-submitted images 312a-d including the same view as the selected curated image 306b. For example, based on detecting selection of the user-submitted image 312d, the image surfacing system 106 can present five additional thumbnails of the five remaining user-submitted images depicting the product from the right-side view. In one embodiment, based on detecting user selection of the selectable text "similar views" associated with the sub-set of user-submitted images area 314, the image surfacing system 106 presents a thumbnail view of all user-submitted images depicting the product from the selected view.

Based on detecting selection of one of the user-submitted images 312a-d, the image surfacing system 106 updates the product display graphical user interface 304 to enlarge the selected user-submitted image. For example, based on detecting user selection of the user-submitted image 312c depicted in FIG. 3A, the image surfacing system 106 presents an enlarged version of the user-submitted image 312c. FIG. 3B illustrates the product display graphical user interface 304 including the user-submitted image 312c within the enlarged image area 310.

FIG. 3B illustrates the product display graphical user interface 304 on the screen 302 of the user client device 108. The product display graphical user interface 304 includes the curated images 306a-c as well as the enlarged image area 310. The enlarged image area 310 comprises an enlarged depiction of the selected user-submitted image 312c. As mentioned, the image surfacing system 106 provides additional visual detail regarding the selected user-submitted image 312c via the enlarged image area 310. For example, the image surfacing system 106 can zoom into identified portions of the user-submitted image 312c.

The image surfacing system 106 also displays enlarged versions of other user-submitted images based on user selection of arrows within the enlarged image area 310. As illustrated, the enlarged image area 310 includes a right arrow and a left arrow. Based on detecting user selection of right and left arrows, the image surfacing system 106 displays the next or previous image of the user-submitted images 312a-d, respectively.

As mentioned, based on detecting user selection of the additional views element 308 illustrated in FIG. 3A, the image surfacing system 106 updates the product display graphical user interface 304 to provide additional views not captured by the curated images 306a-c. FIG. 3C illustrates the product display graphical user interface 304 including user-submitted images that depict the product in additional views.

As illustrated in FIG. 3C the image surfacing system 106 presents the product display graphical user interface 304 on the screen 302 of the user client device 108. The product display graphical user interface 304 includes additional view clusters 320a-320f (or simply "additional view clusters 320") and an overview element 318.

Based on detecting user selection of the overview element 318, the image surfacing system 106 updates the product display graphical user interface 304 to present the curated images. For example, the image surfacing system 106 can update the product display graphical user interface 304 to display elements depicted in FIG. 3A.

The additional view clusters 320 include user-submitted images depicting additional views that are missing from the curated images 306a-c. As illustrated in FIG. 3C, the image surfacing system 106 presents the user-submitted images organized by view. For example, the additional view cluster 320a includes user-submitted images depicting the product with a bottom view, the additional view cluster 320b includes user-submitted images depicting the product with a top view, etc. Based on detecting user selection with any one of the additional view clusters 320, the image surfacing system 106 expands the selected cluster to display individual user-submitted images within the selected cluster.

As shown by FIGS. 3A-3C, the image surfacing system 106 can greatly reduce user actions and navigating to different window or through different pops required by conventional systems in order to find relevant, high-quality user-submitted images. In particular, the interactive user interface shown in FIGS. 3A-3C and described above, intelligently gathers, using computer vision techniques, and surfaces high-quality user submitted images via a single interface that does not require navigation and searching of potentially hundreds of user reviews.

As mentioned above in connection with FIG. 2, because user-submitted images often include noise and other objects beside the product, the image surfacing system 106 can process user-submitted images before generating feature vectors. In particular, the image surfacing system 106 may isolate the product in the user-submitted images and then extract the feature vector. If the image surfacing system 106 extracts a feature vector from a user-submitted image before isolating the product, the image surfacing system 106 may extract a distorted feature vector based on other objects captured within the user-submitted image. FIG. 4 illustrates a series of acts 400 that the image surfacing system 106 can perform to isolate the product and generate feature vectors of the isolated portions of the user-submitted images. In particular, the series of acts 400 can include act 402 of identifying the product in user-submitted images, act 404 of isolating the product bounding box, and act 408 of extracting feature vectors from the product bounding box.

In act 402 of the series of acts 400, the image surfacing system 106 identifies the product in user-submitted images. As part of the act 402, the image surfacing system 106 scans the user-submitted images to identify objects and corresponding confidence scores. For example, as part of the act 402, the image surfacing system 106 generates three outputs: object bounding boxes, labels, and corresponding confidence scores. As illustrated in FIG. 4, the image surfacing system 106 identifies objects within user-submitted image 410. The image surfacing system 106 generates object bounding boxes that encompass individual objects and generates labels for each of the bounding boxes. For example, the image surfacing system 106 generates an object bounding box with a label "shoe" and a second object bounding box with a label "chair" for the user-submitted image 410. Though not illustrated, the image surfacing system 106 generates a confidence score corresponding to each bounding box and label. The confidence score reflects a degree of confidence with which the user-submitted image predicts the label.

The image surfacing system 106 may utilize a variety of different object detectors such as a classification neural network to perform the act 402. In one embodiment, the image surfacing system 106 utilizes a Faster Regional-Convolutional Neural Network (R-CNN) object detection architecture pre-trained on an Open Images dataset to classify objects within input images. The Faster R-CNN may include multiple convolutional layers that generate values (or feature maps) for user-submitted images. As mentioned, the image surfacing system 106 may train an object classification neural network on an Open Images dataset. The Open Images dataset includes numerous (e.g., on the order of millions) images that have been annotated with object bounding boxes and labels. The Open Images dataset considers hundreds of object classes and categories during training. In at least one embodiment the image surfacing system 106 utilizes an e-commerce specific dataset including various e-commerce products to improve the accuracy of the object classification neural network with respect to e-commerce platforms. FIG. 5 describes how the image surfacing system 106 utilizes a region proposal neural network to locate and identify the product in user-submitted images.

In one or more implementations, the image surfacing system 106 identifies object bounding boxes with labels corresponding to the product. In one embodiment, the image surfacing system 106 analyzes corresponding confidence scores to determine whether an object bounding box qualifies as a product bounding box including the product. For example, as illustrated in FIG. 4, the image surfacing system 106 determines that the label "Shoe" corresponds to the product and thus identifies the product bounding box in the user-submitted image 410. In at least one embodiment, the image surfacing system 106 identifies the product in the user-submitted image 410 based on the confidence score corresponding to the product label and the product bounding box meeting a threshold confidence. For example, if the image surfacing system 106 determines that none of the labels within a user-submitted image are associated with the product, the image surfacing system 106 determines that the user-submitted image is irrelevant and does not include the product. In another example, even if a label indicates the presence of the product within the user-submitted image 410, if the confidence score does not meet the threshold confidence, the image surfacing system 106 determines that the user-submitted image 410 does not display the user-submitted image.

As illustrated in FIG. 4, the image surfacing system 106 performs the act 404 of isolating the product bounding box. Generally, the image surfacing system 106 removes other objects and background noise. For example, in the act 404, the image surfacing system 106 can crop the product bounding box 412 from the user-submitted image 410.

The series of acts 400 includes the act 408 of extracting a feature vector from the cropped portion of the user-submitted image including the product bounding box. In particular, the image surfacing system 106 uses the product bounding box 412 as input into a feature vector generator 406 (such as those described above) to generate user-submitted image feature vector 414. The image surfacing system 106 uses the same feature vector generator 406 to extract feature vectors for the curated images and the user-submitted images.

As mentioned above, in one or more embodiments, the image surfacing system 106 utilizes and objection detection model to identify and locate the product within user submitted images. FIG. 5 illustrates one implementation of an object detector model that the image surfacing system 106 can utilize. In particular, FIG. 5 illustrates a region proposal neural network 530 in accordance with one or more implementations. In general, the region proposal neural network 530 can detect objects in images. In one or more embodiments, the region proposal neural network 530 is a deep learning convolutional neural network (CNN). For example, in some embodiments, the region proposal neural network 530 is a region-based CNN (R-CNN). While FIG. 5 illustrates one implementation of a region proposal neural network, the object selection system 106 can utilize alternative implementations. For instance, another example of a region proposal network is found in S. Ren, K. He, R. Girshick, and J. Sun, *Faster R-CNN. Towards real-time object detection with region proposal networks*, NIPS, 2015, the entire contents of which is hereby incorporated by reference.

As shown in FIG. 5, the region proposal neural network 530 includes lower neural network layers 538 and higher neural network layers 540. In general, the lower neural network layers 538 collectively form an encoder and the higher neural network layers 540 collectively form a decoder (or potential object detector). In one or more embodiments, the lower neural network layers 538 are convolutional layers that encode the images 534 into feature vectors, which are outputted from the lower neural network layers 538 and inputted to the higher neural network layers 540. In various implementations, the higher neural network layers 540 can comprise fully-connected layers that analyze the feature vectors and output the region proposals 542 (e.g., bounding boxes around potential objects) and the object proposal scores 544.

In particular, the lower neural network layers 538 can comprise convolutional layers that generate a feature vector in the form of a feature map. To generate the region proposals 542, the region proposal neural network 530 processes the feature map utilizing a convolutional layer in the form of a small network that is slid across small windows of the feature map. The region proposal neural network 530 then maps each sliding window to a lower-dimensional feature. The region proposal neural network 530 then processes this feature using two separate heads that are fully connected layers. In particular, the first head can comprise a box-regression layer that generates the region proposals 542 and a box-classification layer that generates the object proposal scores 544. As noted above, for reach region proposal, the region proposal neural network 530 can generate a corresponding object proposal score 544. The object proposals score 544 can correspond to the confidence score described above.

As mentioned, the image surfacing system 106 determines a sub-set of user-submitted images that are similar to (i.e., depicting the same views/orientations of a product) a curated image based on comparing the feature vectors. FIG. 6 illustrates how the image surfacing system 106 can identify a subset of user-submitted images and map them to a similar curated image in one embodiment. As illustrated in FIG. 6, the image surfacing system 106 can perform act 602 of mapping the feature vectors in a vector space, act 604 of clustering user-submitted images, and act 606 of creating a new cluster.

In the act 602 illustrated in FIG. 6, the image surfacing system 106 maps the feature vectors in a vector space. For example, the image surfacing system 106 can map the feature vectors from the user-submitted images and a feature vector from a curated image as points in an n-dimensional vector space, where n is the number of features. As illustrated in FIG. 6, the image surfacing system 106 maps a curated image feature vector 610 and user-submitted image feature vectors 612a-612e (collectively "user-submitted image feature vectors 612") in a vector space.

In the act 604, the image surfacing system 106 clusters the user-submitted images. The image surfacing system 106 groups a sub-set of user-submitted images to a similar curated image by grouping the user-submitted image feature vectors 612 with the nearest curated image feature vector 610. The image surfacing system 106 can use a variety of clustering algorithms to cluster the user-submitted image feature vector 612. In one embodiment, the image surfacing system 106 performs k nearest matching to cluster the user-submitted image feature vectors 612 with the k nearest neighbors. For example, the image surfacing system 106 may generate clusters by grouping each of the user-submitted image feature vectors 612 with its 2 nearest neighbors (k=2).

As part of determining the k nearest neighbors, the image surfacing system 106 determines distances between feature vectors. For example, the image surfacing system 106 calculates distances between feature vectors to determine the appropriate cluster with which to group a user-submitted image feature vector. The image surfacing system 106 may calculate distances between feature vectors using various methods. In one embodiment, the image surfacing system 106 simply determines a Euclidean distance between feature vectors. In another embodiment, the image surfacing system 106 utilizes the Minkowski method to calculate distances between feature vectors.

In one embodiment, the image surfacing system 106 determines a sub-set of user-submitted images 616 similar to the curated image based on a threshold similarity value. For example, the image surfacing system 106 determines a sub-set of similar user-submitted images comprising user-submitted images whose feature vectors meet a 0.9 (i.e., 90%) threshold similarity value with the curated image feature vector 610. In the vector space, the image surfacing system 106 expresses the threshold similarity value using a threshold distance 614 from the curated image feature vector 610. In particular, the image surfacing system 106 maps only the closest matching (i.e., the most similar) user-submitted image feature vectors 612 to the curated image feature vector 610. As illustrated in FIG. 6, the user-submitted image feature vectors 612a-612c fall within the threshold distance 614 from the curated image feature vector 610. As further illustrated, the distances between the user-submitted image feature vectors 612d-612e and the curated image feature vector 610 exceed the threshold distance 614 and are thus excluded from the sub-set of user-submitted images 616.

Though not illustrated, in one embodiment, the image surfacing system 106 determines a sub-set of user-submitted images similar to the curated image by grouping the user-submitted image feature vectors 612 with the nearest curated image feature vector 610. In such embodiments, the image surfacing system 106 determines k number of clusters, where k is the number of curated images. The image surfacing system 106 can group all of the user-submitted image feature vectors 612 to the nearest curated image feature vector. For example, the image surfacing system 106 can map all of the user-submitted image feature vectors 612 to the curated image feature vector 610.

As illustrated in FIG. 6, the image surfacing system 106 performs the act 606 of creating a new cluster. In particular, the image surfacing system 106 generates one or more new clusters comprising user-submitted images whose feature vectors exceed the threshold distance 614. For example, the image surfacing system 106 generates a new cluster 618 comprising the user-submitted image feature vectors 612d-612e that exceed the threshold distance 614 from the curated image feature vector 610. The image surfacing system 106 determines that the user-submitted images in the new cluster 618 are significantly different from the curated image feature vector 610 and other curated image feature vectors. The image surfacing system 106 determines that user-submitted images display the product using different views missing from the curated images.

The image surfacing system 106 can map user-submitted images to new clusters. As illustrated in FIG. 6, the new cluster 618 does not include the curated image feature vector 610 or any other curated image feature vectors. Thus, the image surfacing system 106 must identify a point from which the image surfacing system 106 can measure a threshold distance. In one embodiment, the image surfacing system 106 identifies a central user-submitted image feature vector (e.g., central user-submitted image feature vector 612d or 612e). In other embodiments, the image surfacing system 106 determines an epicenter from which to measure the threshold distance 614. Based on the feature vector from the new user-submitted image exceeding the threshold distance 614 from the epicenter or the central user-submitted image feature vector, the image surfacing system 106 generates yet another new cluster. As the image surfacing system 106 receives and scans user-submitted images, the image surfacing system 106 continues to map the user-submitted images to existing clusters or generate new clusters.

FIG. 6 illustrates one example technique that the image surfacing system 106 can use to cluster user-submitted images and map them to curated images. FIG. 7 illustrates an example back-end mapping created by the image surfacing system 106 utilizing the clustering and mapping techniques described above. In particular, FIG. 7 illustrates how the image surfacing system 106 organizes and clusters user-submitted images.

As illustrated in FIG. 7, the image surfacing system 106 generates a mapping. The image surfacing system 106 maps user-submitted image clusters 706a-706f to curated images 702a-702c or missing views 704. Each of the user-submitted image clusters 706a-706f includes a group of similar user-submitted images such as user-submitted images 708a-708d.

Generally, the image surfacing system 106 receives the curated images 702a-702c from a seller of a product. The curated images 702a-702c can include different views or angles of the product. For example, the curated image 702a depicts the product from a first side view, the curated image 702b depicts the product from a front view, and the curated image 702c depicts the product from a second side view.

The image surfacing system 106 generates the user-submitted image clusters 706a-706f and maps them to similar curated images 702. The user-submitted image clusters 706a-706f include images portraying the product from the same view as the corresponding curated images 702. For example, as illustrated in FIG. 7, the image surfacing system 106 generates the user-submitted image cluster 706a comprising the user-submitted images 708a-708d depicting the product in the first side view. The image surfacing system 106 maps the user-submitted image cluster 706a to the curated image 702a with the same view (i.e., the first side view). As illustrated, the image surfacing system 106 maps the user-submitted image cluster 706b to the curated images 702b and the user-submitted image cluster 706c to the curated image 702c.

As mentioned, the curated images 702a-702c often offer a limited number of angles and views. The image surfacing system 106 identifies the missing views 704 based on received user-submitted images. In particular, the image surfacing system 106 identifies user-submitted images whose feature vectors meet a threshold distance from feature vectors of the curated images 702. For example, the image surfacing system 106 determines that the user-submitted image clusters 706d-706f include images that are different from and contain different views from the curated images 702a-c. Thus, the image surfacing system 106 identifies the missing views 704 based on the user-submitted image clusters 706d-706f. For example, the image surfacing system 106 generates the user-submitted image cluster 706d and determines that user-submitted images within the user-submitted image cluster 706d portray the product from a bottom view, which is missing from the curated images 702a-c. As illustrated in FIG. 7, the image surfacing system 106 maps each of the user-submitted image clusters 706d-706f to the corresponding missing views 704.

As mentioned, the image surfacing system 106 surfaces the user-submitted images organized by the user-submitted image clusters. For example, the image surfacing system 106 presents the user-submitted images 708a-708d within the user-submitted image cluster 706a. Additionally, the image surfacing system 106 surfaces user-submitted images within new user-submitted clusters. For example, based on detecting user indication of the additional views element 208, the image surfacing system 106 presents the user-submitted image clusters 706d-706f representing the missing views 704. The image surfacing system 106 may also present individual user-submitted images within each of the user-submitted image clusters 706d-706f.

Figure 8:
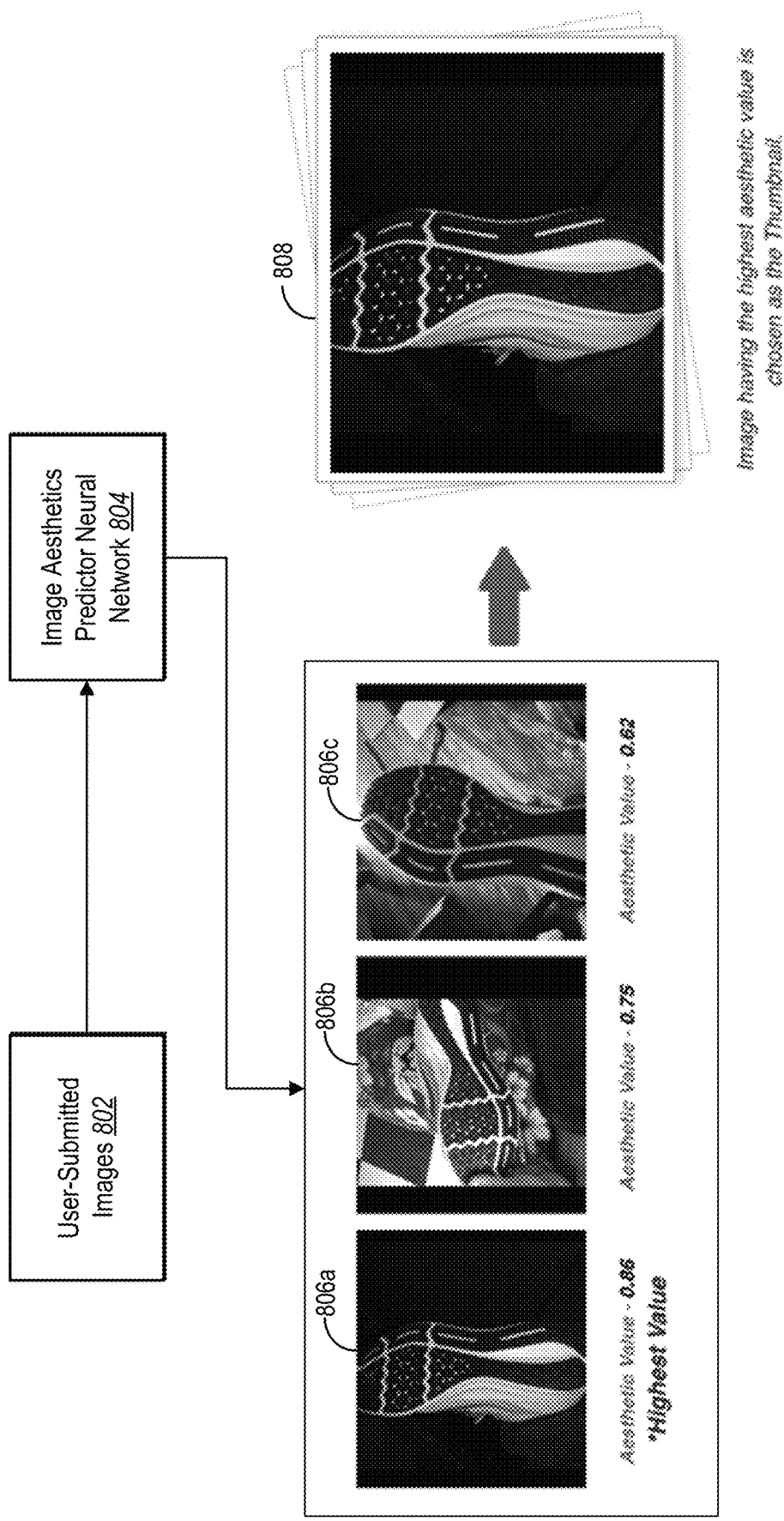
FIG. 8 illustrates an overview of the image surfacing system generating aesthetic values for user-submitted images in accordance with one or more embodiments of the present disclosure.

The image surfacing system 106 can further organize user-submitted images presented via the graphical user interface based on an aesthetic score. User-submitted images often vastly range in image quality. For example, many user-submitted images are blurry or taken in poor lighting conditions. FIG. 8 illustrates how the image surfacing system 106 may present images ordered by aesthetic value via the graphical user interface.

As illustrated in FIG. 8, the image surfacing system 106 inputs user-submitted images 802 into an image aesthetics predictor neural network 804. The image aesthetics predictor neural network 804 generates aesthetic values for each of the user-submitted images 806a-806c within a cluster. The image surfacing system 106 identifies a thumbnail to present on stack 808 representing the cluster based on aesthetic value. Additionally, based on detected user selection of the stack 808, the image surfacing system 106 presents the highest aesthetic value user-submitted images first.

As illustrated in FIG. 8, the image surfacing system 106 utilizes the image aesthetics predictor neural network 804 to generate aesthetic values for the user-submitted images 802. The image aesthetics predictor neural network 804 estimates aesthetic quality of digital images using deep learning. In particular, the image aesthetic predictor neural network 804 computes a global aesthetics/quality value for each of the user-submitted images 806 in addition to various aesthetics attributes values. Aesthetics attributes values include, for example, interesting content, object emphasis, good lighting, and other attributes.

The image aesthetics predictor neural network 804 generates aesthetic values for each of the user-submitted images 806a-806c within a cluster. As illustrated, the user-submitted images 806a-806c all belong to the same cluster depicting the product from a bottom view. The image aesthetics predictor neural network 804 assigns an aesthetic value, for example, between 0 to 1, and the image surfacing system 106 orders the user-submitted images 806a-806c by aesthetic value.

The image surfacing system 106 presents the user-submitted images 806a-806c within a cluster to the user based on the estimated aesthetics values. In particular, the image surfacing system 106 presents the user-submitted images with higher aesthetic values first. Furthermore, as illustrated in FIG. 8, the image surfacing system 106 chooses the user-submitted image having the highest aesthetic value as the thumbnail, which will be shown to the user via the graphical user interface. For example, when the image surfacing system 106 presents the stack 808 of user-submitted images that include a new view (i.e., not included by the curated images), the image surfacing system 106 presents the user-submitted image 806a having the highest aesthetic value as the thumbnail.

Furthermore, as mentioned, the image surfacing system 106 presents the user-submitted images 806a-806c ordered by aesthetic value. For example, based on detecting user selection of the stack 808, the image surfacing system 106 displays the individual user-submitted images within the stack 808. The image surfacing system 106 presents, in order, the user-submitted image 806a, the user-submitted image 806b, and the user-submitted image 806c. Thus, the image surfacing system 106 reduces the computational and time resources needed to locate and view relevant and high-quality user-submitted images.

Figure 9:
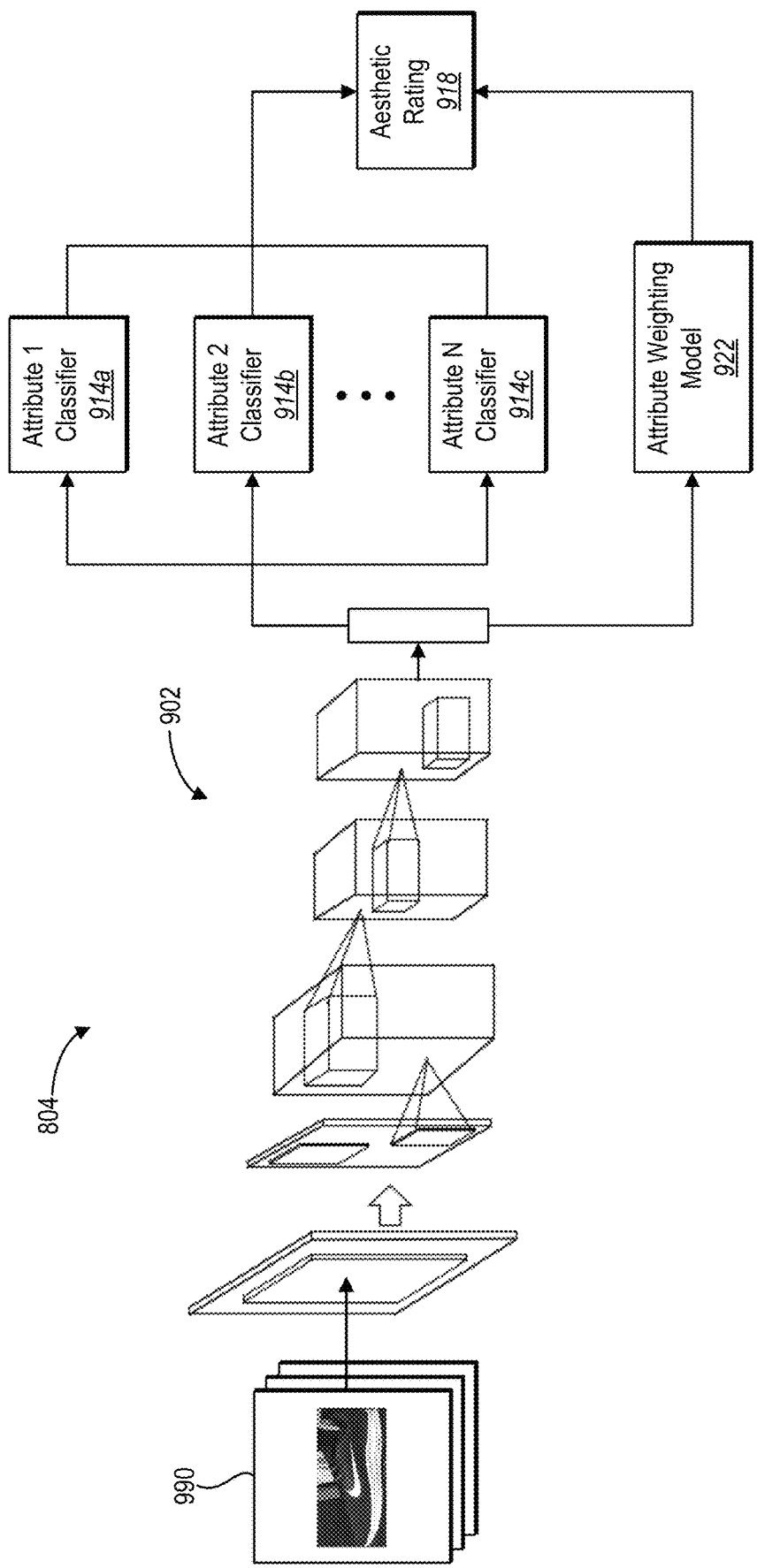
FIG. 9 illustrates a schematic diagram of an attribute rating neural network for generating aesthetic values for images in accordance with one or more embodiments of the present disclosure.

FIG. 9 provides additional detail regarding an embodiment of the image aesthetics predictor neural network 804. In particular, image aesthetics predictor neural network 804 can comprise the higher neural network layers (e.g., attribute classifiers 914a-914c) and an attribute weighting model 922. FIG. 9 shows that image aesthetics predictor neural network 804 shares the lower neural network layers 902 (i.e., the feature encoder). In alternative embodiments, each classifier can have a separate feature encoder.

Image aesthetics predictor neural network 804 provides ratings of images 990. For example, upon receiving an input image (e.g., a cropped user-submitted image), the image aesthetics predictor neural network 804 provides the image to the feature encoder (i.e., lower neural network layers 902), which generate a feature vector for the image. Image aesthetics predictor neural network 804 then provides the feature vector to each of the attribute classifiers 914a-914c and the attribute weighting model 922. The attribute classifiers 914a-914c each output an attribute rating for a given attribute.

Attributes refer to characteristics of an image. For example, attributes can comprise but are not limited to, (1) interesting content, (2) object emphasis, (3) good lighting, (4) color harmony, (5) vivid color, (6) depth of an image field, (7) motion blur, (8) rule of thirds, (9) balancing element, (10) repetition, and (11) symmetry.

In one or more embodiments, the aesthetic ratings are a numeric value representative of a quality of appearance. For example, an aesthetic rating can comprise a value between zero and one, or between zero percent and one-hundred percent, indicating the quality of appearance of an image. Additionally, the aesthetic rating can comprise a weighted sum of attributes. For example, each of the attributes can be associated with different weights.

In addition, the attribute weighting model 922 outputs a multi-dimensional weighting vector that includes an attribute weight for each attribute having a corresponding attribute classifier 914a-914c. The individual attribute weights indicate how to combine the attribute ratings output from the attribute classifiers 914a-914c to best generate an aesthetic rating for an image. In particular, to generate an aesthetic rating 918, image aesthetics predictor neural network 804 weights the attribute ratings output from the attribute classifiers 914a-914c by a corresponding weight output from the attribute weighting model 922 and then sums the weight-adjusted attribute ratings scores to generate the aesthetic rating 918.

In alternative implementations, the image surfacing system 106 can utilize another image rating model, such as those described in U.S. patent Ser. No. 15/097,113 entitled "UTILIZING DEEP LEARNING FOR RATING AESTHETICS OF DIGITAL IMAGES," filed Apr. 12, 2016, which is hereby incorporated by reference in its entirety.

Figure 10:
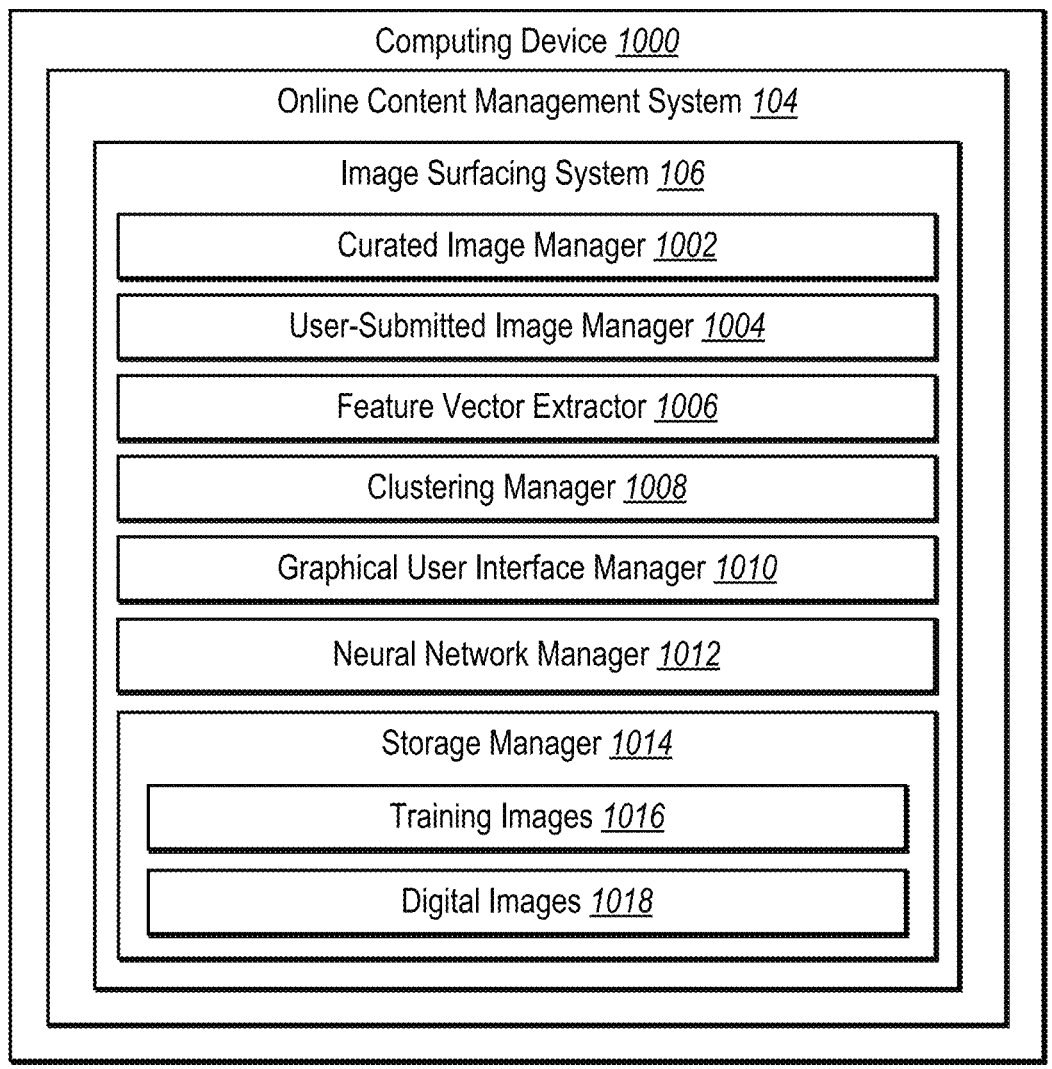
FIG. 10 illustrates a schematic diagram of an example architecture of the image surfacing system in accordance with one or more embodiments of the present disclosure.

FIG. 10 illustrates a schematic diagram of components of the image surfacing system 106 in accordance with one or more embodiments. As shown, the image surfacing system 106 can be implemented by a computing device 1000 (e.g., the user client device 108, the client device 114, and/or the server device(s) 102). Additionally, the image surfacing system 106 can be part of the online content management system 104. The image surfacing system 106 can include, but is not limited to, a curated image manager 1002, a user-submitted image manager 1004, a feature vector extractor 1006, a clustering manager 1008, a graphical user interface manager 1010, a neural network manager 1012, and a storage manager 1014 storing training images 1016 and digital images 1018. The image surfacing system 106 can be implemented as part of the e-commerce management system 104 in a distributed system of server devices for managing an e-commerce platform. Alternatively, the image surfacing system 106 can be implemented on a single computing device such as the user client device 108 or the client device 114 of FIG. 1.

In one or more embodiments, each of the components of the image surfacing system 106 are in communication with one another using any suitable communication technologies. Additionally, the components of the image surfacing system 106 can be in communication with one or more other devices including the user client device 108 and the client device 114, as illustrated in FIG. 1. Although the components of the image surfacing system 106 are shown as separate in FIG. 10, any of the subcomponents may be combined into fewer components, such as into a single component or divided into more components as may serve a particular implementation. Furthermore, although the components of FIG. 10 are described in connection with the image surfacing system 106, at least some of the components for performing operations in conjunction with the image surfacing system 106 described herein may be implemented on other devices within the environment.

The components of the image surfacing system 106 can include software, hardware, or both. For example, the components of the image surfacing system 106 can include one or more instructions stored on a computer-readable storage medium and executable by processors of one or more computing devices (e.g., the user client device 108 and/or the client device 114). When executed by the one or more processors, the computer-executable instructions of the image surfacing system 106 can cause the computing devices to perform the image clustering methods described herein. Alternatively, the components of the image surfacing system 106 can comprise hardware, such as a special purpose processing device to perform a certain function or group of functions. Additionally, or alternatively, the components of the image surfacing system 106 can include a combination of computer-executable instructions and hardware.

Furthermore, the components of the image surfacing system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the image surfacing system 106 may be implemented as part of a stand-alone application on a personal computing device or a mobile device. Alternatively or additionally, the components of the image surfacing system 106 may be implemented in any application that allows creation and delivery of marketing content to users, including, but not limited to, applications in ADOBE® EXPERIENCE CLOUD, such as ADOBE® MAGENTO®, ADOBE® COMMERCE CLOUD, ADOBE® ANALYTICS, ADOBE® MARKETING CLOUD™, and ADOBE® ADVERTISING CLOUD. "ADOBE", "ADOBE MAGENTO", and "ADOBE MARKETING CLOUD" are registered trademarks of Adobe Inc in the United States and/or other countries.

As shown in FIG. 10, the image surfacing system 106 includes the curated image manager 1002. The curated image manager 1002 receives, stores, and manages curated images uploaded by a seller. The curated image manager 1002 associates curated images with relevant products. The curated image manager 1002 also stores and manages data relevant to the curated images. For example, the curated image manager 1002 stores metadata and feature vectors for the curated images.

The image surfacing system 106 also includes the user-submitted image manager 1004. The user-submitted image manager 1004 receives, stores, and manages user-submitted images uploaded by users of an e-commerce platform. For example, the user-submitted image manager 1004 receives images from buyers of a product. Additionally, the user-submitted image manager 1004 stores user-submitted images organized by cluster. The user-submitted image manager 1004 communicates with the clustering manager 1008 to determine the proper organization for the user-submitted images. Furthermore, the user-submitted image manager 1004 generates, manages, and stores product bounding boxes, product labels, and corresponding confidence scores for the user-submitted images.

The feature vector extractor 1006 extracts feature vectors from curated images and user-submitted images. In particular, the feature vector extractor 1006 utilizes a machine learning model to extract feature vectors. Additionally, the feature vector extractor 1006 associates the extracted feature vectors with the corresponding images. In particular, the feature vector extractor 1006 communicates with the curated image manager 1002 to access curated images. The feature vector extractor 1006 also communicates with the user-submitted image manager 1004 to access product bounding boxes and user-submitted images.

The clustering manager 1008 generates clusters of images. More particularly, the clustering manager 1008 maps the extracted feature vectors in a vector space. The clustering manager 1008 performs various clustering algorithms to generate clusters of images. The clustering manager 1008 maps user-submitted images to curated images and new clusters. Additionally, the clustering manager 1008 receives or determines and manages distance thresholds from the curated images. The clustering manager 1008 generates and manages new clusters including images depicting missing views.

The image surfacing system 106 also includes the graphical user interface manager 1010. The graphical user interface manager 1010 generates, manages, and receives input from one or more graphical user interfaces. The graphical user interface manager 1010 generates the product display graphical user interface at the user client device that presents the curated images and the user-submitted images. The graphical user interface manager 1010 receives user interaction with one or more of the mentioned elements. For instance, the graphical user interface manager 1010 communicates with the user-submitted image manager 1004 to transmit user-submitted images from the user. Additionally, the graphical user interface manager 1010 communicates with the clustering manager 1008, receives clusters of the user-submitted images, and presents the clustered user-submitted images.

The neural network manager 1012 stores, trains, and applies the various neural networks utilized by the image surfacing system 106. In particular, the neural network manager 1012 trains and applies the image descriptor neural network. During training, the neural network manager 1012 communicates with the storage manager 1014 to retrieve training data including training images and actual feature vectors. The neural network manager 1012 adjusts parameters of neural networks to reduce loss. During application, the neural network manager 1012 accesses curated images and user-submitted images to utilize as input to the image descriptor neural network. The neural network manager 1012 also communicates output feature vectors to the feature vector extractor. Additionally, the neural network manager 1012 trains, stores, and applies the image aesthetics predictor neural network.

The image surfacing system 106 includes the storage manager 1014. The storage manager 1014 stores (via one or more memory devices) the training images 1016 and the digital images 1018. The training images 1016 include actual images and corresponding feature vectors used to train the image descriptor neural network.

The storage manager 1014 also stores the digital images 1018. The digital images 1018 include curated images and user-submitted images. Additionally, the digital images 1018 include feature vectors of the curated images and the user-submitted images.

Figure 11:
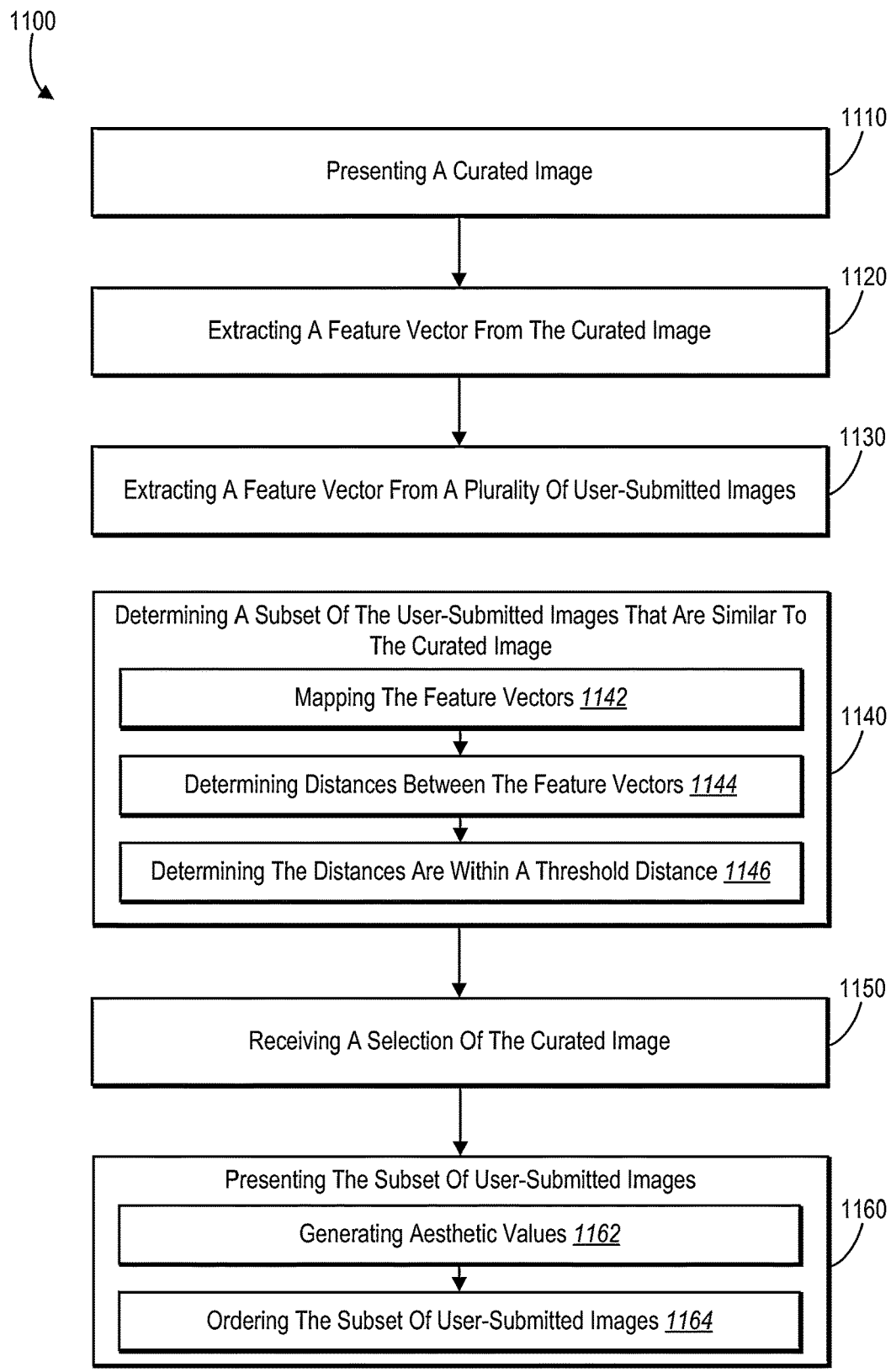
FIG. 11 illustrates a series of acts for determining and presenting a sub-set of user-submitted images that are similar to the curated image in accordance with one or more embodiments of the present disclosure.

FIG. 11 illustrates a flowchart of a method for determining and presenting a subset of user-submitted images. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions that, when executed by one or more processors, cause the computing device to perform the acts of FIG. 11. In still further embodiments, a system can perform the acts of FIG. 11.

As shown in FIG. 11, the series of acts 1100 includes an act 1110 of presenting a curated image. In particular, the act 1110 comprises presenting, via a graphical user interface at a user client device, a curated image displaying a product.

The series of acts 1100 includes act 1120 of extracting a feature vector from the curated image. In particular, the act 1120 comprises extracting, utilizing a machine learning model, a feature vector from the curated image. The act 1120 can further comprise the act of extracting the feature vector from the curated image by generating object descriptors for the product in the curated image.

The series of acts 1100 includes act 1130 of extracting feature vectors from a plurality of user-submitted images. In particular, the act 1130 comprises determining a sub-set of the user-submitted images that are similar to the curated image by comparing the feature vectors of the plurality of user-submitted images with the feature vector of the curated image. The act 1130 can further comprise the act of extracting the feature vectors from the plurality of user-submitted images displaying the product by: generating object bounding boxes and labels for objects in the plurality of user-submitted images, wherein the object bounding boxes comprise product bounding boxes and product labels corresponding to the product; cropping the product bounding boxes; and extracting feature vectors from the product bounding boxes. In at least one embodiment, generating the object bounding boxes and the labels comprises utilizing a trained object classification neural network to identify the object bounding boxes and the labels. Additionally, the act 1130 can further include the act of generating confidence scores corresponding to the labels.

As illustrated in FIG. 11, the image surfacing system 116 performs act 1140 of determining a sub-set of the user-submitted images that are similar to the curated image. In particular, the act 1140 comprises determining a sub-set of the user-submitted images that are similar to the curated image by comparing the feature vectors of the plurality of user-submitted images with the feature vector of the curated image. Additionally, the act 1140 can include determining the sub-set of the user-submitted images that are similar to the curated image by performing act 1142 of mapping the feature vectors, act 1144 of determining distances between the feature vectors, and act 1146 of determining that the distances are within a threshold distance. In particular, the act 1142 comprises mapping the feature vector from the curated image and the feature vectors from the plurality of user-submitted images in a vector space. Act 1144 comprises determining distances between the feature vector from the curated image and each of the feature vectors from the plurality of user-submitted images in the vector space. Act 1146 comprises determining that distances between the feature vectors of the sub-set of user-submitted images and the feature vector from the curated image are within a threshold distance.

The series of acts 1100 includes act 1150 of receiving a selection of the curated image. The act 1150 comprises receiving, via the graphical user interface, a user selection of the curated image. The series of acts 1100 includes act 1160 of presenting the sub-set of user-submitted images. In particular, the act 1160 comprises presenting, via the graphical user interface and based on the user selection of the curated image, the sub-set of user-submitted images that are similar to the curated image. Additionally, the act 1160 can include presenting the sub-set of user-submitted images by performing act 1162 of generating aesthetic values and act 1164 of ordering the subset of user-submitted images. In particular, act 1162 comprises generating aesthetic values for each user-submitted image of the sub-set of user-submitted images. The act 1164 can comprise ordering the sub-set of user-submitted images based on the aesthetic values. The act 1160 can further comprise presenting the ordered sub-set of user-submitted images.

In at least one embodiment, the series of acts 1100 includes the additional acts of determining an additional sub-set of user-submitted images that show the product in a view not included in the curated images by comparing the feature vectors of the plurality of user-submitted images with the feature vectors of the curated images. For example, the series of acts 1100 can include mapping the feature vector from the curated image and the feature vectors from the plurality of user-submitted images in a vector space; determining distances between the feature vector from the curated image and each of the feature vectors from the plurality of user-submitted images in the vector space; determining that distances between the feature vector from the curated image and the feature vectors from one or more user-submitted images of the plurality of user-submitted images exceed a threshold distance; generating a new cluster comprising the one or more user-submitted images; and presenting, via the graphical user interface, the one or more user-submitted images. In particular, the series of acts can involve presenting, via the graphical user interface, one or more of the user-submitted images in the additional sub-set of user-submitted images show the product in a view not included in the curated images.

The series of acts 1100 can also include the additional acts of presenting, via the graphical user interface, an additional views element; receiving, via the graphical user interface, a user selection of the additional views element; and presenting, via the graphical user interface and based on the user selection of the additional views element, one or more user-submitted images comprising different views than the curated image.

In addition (or in the alternative) to the acts described above, in some embodiments, the series of acts 1100 include a step for identifying a sub-set of user-submitted images of a product that have similar orientation and view as a curated image of the product. For example, the acts described in reference to FIGS. 4, 6, and 8 can comprise the corresponding acts (or structure) for performing a step for identifying a sub-set of user-submitted images of a product that have similar orientation and view as a curated image of the product.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. Cloud computing is a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
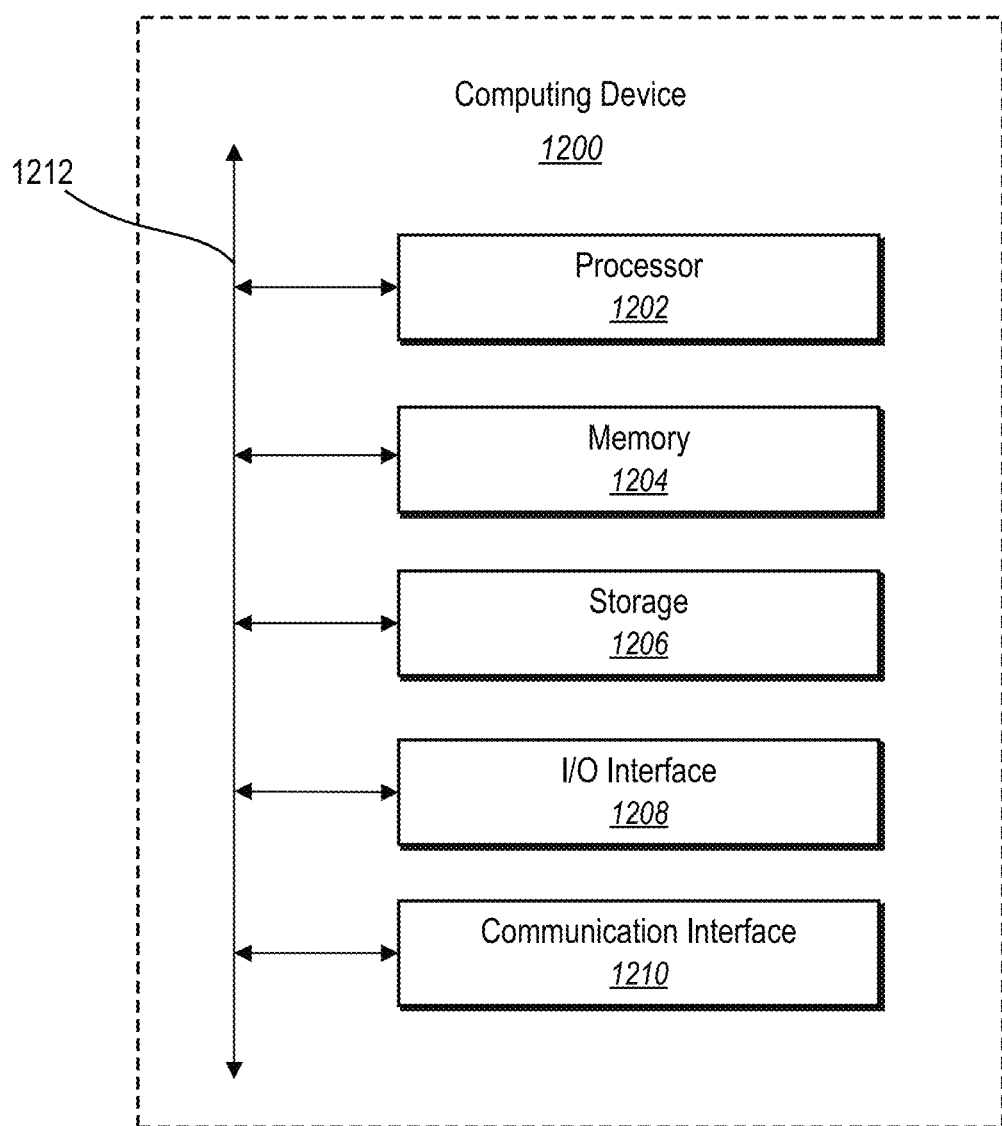
FIG. 12 illustrates a block diagram of an example computing device in accordance with one or more embodiments of the present disclosure.

FIG. 12 illustrates a block diagram of a computing device 1200 that may be configured to perform one or more of the processes described above. One will appreciate that one or more computing devices such as the computing device 1200 may implement the image surfacing system 106 and the e-commerce management system 104. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium for presenting clustered images, the non-transitory computer readable medium comprising instructions that, when executed by at least one processor, cause a computing device to:
   present, via a graphical user interface at a user client device, curated images displaying a product;
   extract, utilizing a machine learning algorithm, one or more frequency domain descriptors from the curated images;
   compile, utilizing the machine learning algorithm, the one or more frequency domain descriptors into feature vectors from the curated images;
   extract, utilizing the machine learning algorithm, one or more frequency domain descriptors from a plurality of user-submitted images displaying the product;
   compile, utilizing the machine learning algorithm, the one or more frequency domain descriptors from the plurality of user-submitted images displaying the product into feature vectors from the plurality of user-submitted images displaying the product;

determine a sub-set of the plurality of user-submitted images for each curated image that show a view of the product positioned at an angle within a threshold distance to a positioned angle of the product within a given curated image by comparing the feature vectors of the plurality of user-submitted images with the feature vectors of the curated images;

determine an additional sub-set of user-submitted images that show the view of the product positioned at one or more additional angles outside of the threshold distance of the positioned angle of the product within the curated images by comparing the feature vectors of the plurality of user-submitted images with the feature vectors of the curated images;

receive, via the graphical user interface, a user selection of a curated image;

present, via the graphical user interface and based on the user selection of the curated image, the sub-set of the user-submitted images that show the view of the product positioned at the angle within the threshold distance to the positioned angle of the product within the curated image;

receive, via the graphical user interface, a user selection of an additional views element; and present, via the graphical user interface and based on the user selection of the additional views element, one or more of the user-submitted images in the additional sub-set of user-submitted images that show the view of the product positioned at the one or more additional angles outside of the threshold distance of the positioned angle of the product within the curated images.

2. The non-transitory computer readable medium as recited in claim 1, further comprising instructions that, when executed by the at least one processor, cause the computing device to extract the one or more frequency domain descriptors from the curated images by generating object descriptors for the product in the curated images.

3. The non-transitory computer readable medium as recited in claim 1, further comprising instructions that, when executed by the at least one processor, cause the computing device to extract the one or more frequency domain descriptors from the plurality of user-submitted images displaying the product by:

generating object bounding boxes and labels for objects in the plurality of user-submitted images, wherein the object bounding boxes comprise product bounding boxes and product labels corresponding to the product;

cropping the product bounding boxes; and extracting frequency domain descriptors from the product bounding boxes.

4. The non-transitory computer readable medium as recited in claim 3, wherein generating the object bounding boxes and the labels comprises utilizing a region proposal neural network to identify the object bounding boxes and the labels.

5. The non-transitory computer readable medium as recited in claim 3, further comprising instructions that, when executed by the at least one processor, cause the computing device to generate confidence scores corresponding to the labels.

6. The non-transitory computer readable medium as recited in claim 1, further comprising instructions that, when executed by the at least one processor, cause the computing device to determine the view of the product positioned at the angle of sub-set of the user-submitted images are within a threshold distance to the positioned angle of the product within the curated image by:

mapping a feature vector from the curated image and the feature vectors from the plurality of user-submitted images in a vector space;

determining distances between the feature vector from the curated image and each of the feature vectors from the plurality of user-submitted images in the vector space; and determining that distances between the feature vectors of the sub-set of the user-submitted images and the feature vector from the curated image are within a threshold distance.

7. The non-transitory computer readable medium as recited in claim 1, further comprising instructions that, when executed by the at least one processor, cause the computing device to determine the view of the product positioned at one or more additional angles of the additional sub-set of user-submitted images is outside of the threshold distance of the positioned angle of the product within the curated images by:

mapping the feature vectors from the curated images and the feature vectors from the plurality of user-submitted images in a vector space;

determine distances between the feature vectors from the curated images and each of the feature vectors from the plurality of user-submitted images in the vector space;

determine that distances between the feature vectors from the curated images and the feature vectors from one or more user-submitted images of the plurality of user-submitted images exceed a threshold distance; and generate a new cluster comprising the one or more user-submitted images.

8. The non-transitory computer readable medium as recited in claim 1, further comprising instructions that, when executed by the at least one processor, cause the computing device to present the sub-set of the user-submitted images by:

generating aesthetic values for each user-submitted image of the sub-set of the user-submitted images;

ordering the sub-set of the user-submitted images based on the aesthetic values; and presenting the ordered sub-set of the user-submitted images.

9. The non-transitory computer readable medium as recited in claim 1, wherein the curated image comprises a product image created by a seller of the product.

10. A system comprising:

at least one non-transitory computer readable medium storing a curated image displaying a product and a plurality of user-submitted images displaying the product; and at least one server configured to cause the system to:

present, via a graphical user interface at a user client device, the curated image displaying a first angled position of the product in a first view;

extract, utilizing a machine learning algorithm, one or more frequency domain descriptors from the curated image;

compile, utilizing the machine learning algorithm, the one or more frequency domain descriptors into a scale and rotation invariant feature vector from the curated image;

extract, utilizing the machine learning algorithm, one or more frequency domain descriptors from the plurality of user-submitted images displaying product;

compile, utilizing the machine learning algorithm, the one or more frequency domain descriptors into scale and rotation invariant feature vectors from the plurality of user-submitted images displaying the first angled position of the product in the first view and one or more additional angled positions of the product in one or more additional views;

map the scale and rotation invariant feature vector from the curated image and the scale and rotation invariant feature vectors from the plurality of user-submitted images in a vector space;

cluster a sub-set of the plurality of user-submitted images that display the first angled position of the product in the first view with the curated image by determining that scale and rotation invariant feature vectors from the sub-set of the plurality of user-submitted images are within a threshold distance of the scale and rotation invariant feature vector from the curated image;

receive, via the graphical user interface, a user selection of the curated image; and present, via the graphical user interface and based on the user selection of the curated image, the sub-set of user-submitted images that display the first angled position of the product in the first view.

11. The system as recited in claim 10, wherein the at least one server is further configured to cause the system to extract the one or more frequency domain descriptors from the curated image by generating object descriptors for the product in the curated image.

12. The system as recited in claim 10, wherein the at least one server is further configured to cause the system to extract the one or more frequency domain descriptors from the plurality of user-submitted images by:
generating object bounding boxes and labels for objects in the plurality of user-submitted images, wherein the object bounding boxes comprise product bounding boxes and product labels corresponding to the product;
cropping the product bounding boxes; and
extracting frequency domain descriptors from the product bounding boxes.

13. The system as recited in claim 12, wherein generating the object bounding boxes and the labels comprises utilizing a region proposal neural network.

14. The system as recited in claim 12, wherein the at least one server is further configured to cause the system to generate confidence scores corresponding to the labels.

15. The system as recited in claim 10, wherein the at least one server is further configured to cause the system to:
determine that distances between the scale and rotation invariant feature vector from the curated image and scale and rotation invariant feature vectors from one or more user-submitted images of the plurality of user-submitted images exceed the threshold distance;
generate a new cluster comprising the one or more user-submitted images; and
present, via the graphical user interface, the one or more user-submitted images.

16. The system as recited in claim 10, wherein the at least one server is further configured to cause the system to present the sub-set of the user-submitted images by:
generating aesthetic values for each user-submitted image of the sub-set of the user-submitted images;
ordering the sub-set of the user-submitted images based on the aesthetic values; and
presenting the ordered sub-set of the user-submitted images.

17. The system as recited in claim 10, wherein the at least one server is further configured to cause the system to:
present, via the graphical user interface, an additional views element;
receive, via the graphical user interface, a user selection of the additional views element; and
present, via the graphical user interface and based on the user selection of the additional views element, one or more user-submitted images comprising one or more additional angled positions of the product in one or more additional views.

18. A computer-implemented method comprising:
presenting, via a graphical user interface at a user client device, a curated image displaying a first angled position of a product in a first view;
extracting, utilizing a machine learning algorithm, one or more frequency domain descriptors from curated images of the product;
compiling, utilizing the machine learning algorithm, the one or more frequency domain descriptors into feature vectors from the curated images;
extracting, utilizing the machine learning algorithm, one or more frequency domain descriptors from a plurality of user-submitted images displaying the product;
compiling, utilizing the machine learning algorithm, the one or more frequency domain descriptors from the plurality of user-submitted images displaying the product into feature vectors from the plurality of user-submitted images displaying the product;
determining a sub-set of the user-submitted images for each curated image that show a view of the product positioned at an angle within a threshold distance to a positioned angle of the product within a given curated image by comparing the feature vectors of the plurality of user-submitted images with the feature vectors of the curated images;
determining an additional sub-set of user-submitted images that show the view of the product positioned at one or more additional angles outside of the threshold distance of the positioned angle of the product within the curated images by comparing the feature vectors of the plurality of user-submitted images with the feature vectors of the curated images;
receiving, via the graphical user interface, a user selection of a curated image;
presenting, via the graphical user interface and based on the user selection of the curated image, the sub-set of the user-submitted images that show the view of the product positioned at the angle within the threshold distance to the positioned angle of the product within the curated image;
receiving, via the graphical user interface, a user selection of an additional views element; and
presenting, via the graphical user interface and based on the user selection of the additional views element, one or more of the user-submitted images in the additional sub-set of user submitted images that show the view of the product positioned at the one or more additional angles outside of the threshold distance of the positioned angle of the product within the curated images.

19. The computer-implemented method as recited in claim 18, further comprising:
extracting the one or more frequency domain descriptors from the curated images by generating object descriptors for the product in the curated images.

20. The computer-implemented method as recited in claim 18, further comprising:

generating aesthetic values for each user-submitted image of the sub-set of the user-submitted images;
ordering the sub-set of the user-submitted images based on the aesthetic values; and
presenting the ordered sub-set of the user-submitted images.

\* \* \* \* \*